(12) United States Patent
Lowe et al.

(10) Patent No.: US 10,113,646 B2
(45) Date of Patent: Oct. 30, 2018

(54) FIRE RETARDANT HIGH TEMPERATURE DRYER SEALS AND RELATED METHODS

(71) Applicant: Felters of South Carolina, LLC, Roebuck, SC (US)

(72) Inventors: Vernon J. Lowe, Greenback, TN (US); James Justice, Roebuck, SC (US); Christina D. Viets, Maryville, TN (US)

(73) Assignee: Felters of South Carolina, LLC, Roebuck, SC (US)

( * ) Notice: Subject to any disclaimer, the term of this patent is extended or adjusted under 35 U.S.C. 154(b) by 0 days.

(21) Appl. No.: 15/426,752

(22) Filed: Feb. 7, 2017

(65) Prior Publication Data

US 2017/0276250 A1    Sep. 28, 2017

Related U.S. Application Data

(63) Continuation of application No. 14/242,855, filed on Apr. 1, 2014, now Pat. No. 9,562,610.

(60) Provisional application No. 61/806,944, filed on Apr. 1, 2013.

(51) Int. Cl.
| | |
|---|---|
| *F16J 15/16* | (2006.01) |
| *D06F 58/04* | (2006.01) |
| *F16J 15/06* | (2006.01) |
| *F26B 25/00* | (2006.01) |

(52) U.S. Cl.
CPC .............. *F16J 15/16* (2013.01); *D06F 58/04* (2013.01); *F16J 15/065* (2013.01); *F26B 25/008* (2013.01); *Y10T 156/1036* (2015.01)

(58) Field of Classification Search
CPC ....... F26B 25/008; F26B 11/024; F16J 15/06; F16J 15/064; F16J 15/065
See application file for complete search history.

(56) References Cited

U.S. PATENT DOCUMENTS

| | | | | |
|---|---|---|---|---|
| 2,459,720 A | * | 1/1949 | Poltorak | F16L 23/22 156/227 |
| 4,156,533 A | * | 5/1979 | Close | F01N 3/2857 277/652 |
| 4,214,571 A | * | 7/1980 | Scherer | F24C 15/021 126/190 |
| 5,407,214 A | * | 4/1995 | Lew | F16J 15/065 277/608 |
| 5,628,520 A | * | 5/1997 | Ueda | F16J 15/104 277/654 |
| 5,765,838 A | * | 6/1998 | Ueda | F16J 15/22 277/580 |
| 2015/0132564 A1 | * | 5/2015 | Arfsten | B01J 13/18 428/312.8 |

* cited by examiner

*Primary Examiner* — Gilbert Y Lee
(74) *Attorney, Agent, or Firm* — J. Bennett Mullinax, LLC

(57) ABSTRACT

Fire retardant dryer seals and related methods are provided herein. A fire retardant dryer seal can include an elongate, flexible base substrate having a first end and a second end. The base substrate can also have a first surface and a second surface opposite the first surface. The first end and the second end of the base substrate secured together so that the base substrate forms at least a portion of an annular shape. A heat resistant coating disposed on at least the first surface of the base substrate.

20 Claims, 13 Drawing Sheets

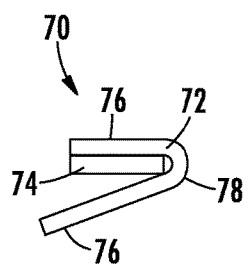 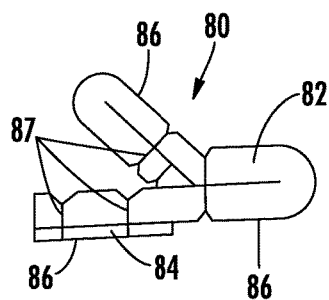 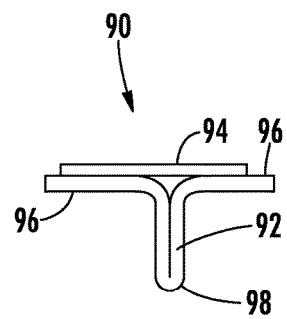
FIG. 3A     FIG. 4A     FIG. 5A
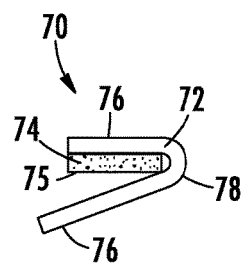 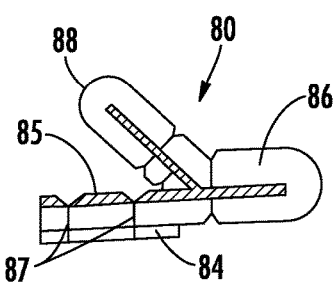 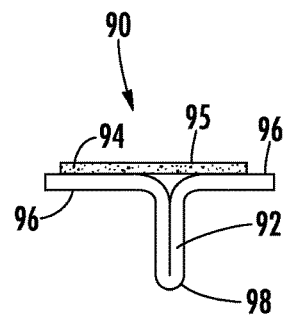
FIG. 3B     FIG. 4B     FIG. 5B
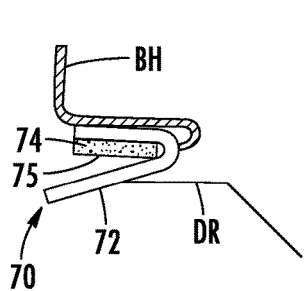 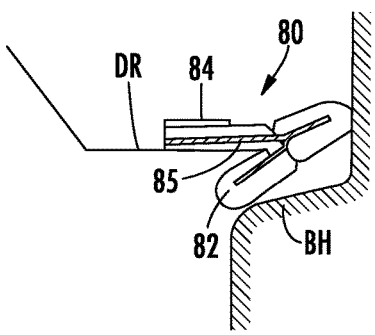 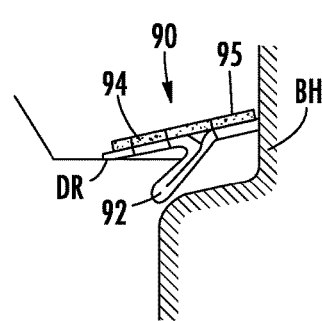
FIG. 3C     FIG. 4C     FIG. 5C

FIRE RETARDANT HIGH TEMPERATURE DRYER SEALS AND RELATED METHODS

RELATED APPLICATION

The presently disclosed subject matter claims the benefit of U.S. patent application Ser. No. 14/242,855 filed Apr. 1, 2014, which, claims the benefit of U.S. Provisional Patent Application Ser. No. 61/806,944, filed Apr. 1, 2013. The disclosures of both patent applications referenced above are incorporated herein by reference in its entirety.

TECHNICAL FIELD

The present subject matter relates to dryer seals and related methods. In particular, the present subject matter relates to fire retardant dryer seals for use in clothes dryer appliances that can withstand extended exposure to high temperatures and methods related to such dryer seals.

BACKGROUND

Domestic clothes dryers are a common household appliance that, in conjunction with domestic washers, have reduced the burden of laundry on many households by reducing the amount of time devoted by household caregivers to washing and drying clothes. Such clothes dryers typically include a housing (also known as a bulkhead) and a rotating drum, or cylinder, supported within the housing. Commercially available air vented domestic clothes dryers use the rotating drum to tumble loads of washed clothes in a heated environment by generally using a blower/fan to pull ambient air across heater coils to raise the temperature of air passing into the drum. The heated air is pulled through the tumbling clothes and out through a lint screen for discharge. Commercially available condensing domestic clothes dryers also use the rotating cylinder to tumble loads of laundry in a heat environment, but treat the air in a slightly different manner. These condensing domestic clothes dryers use a blower/fan to pull ambient air across heater coils into the drum, through the tumbling clothes and out through a lint screen, across a condenser coil to remove moisture, and then return to the drum.

Both types of dryers use dryer seals to support and seal the drum usually at both ends. These dryer seals perform a multitude of functions within these domestic clothes dryers. Current seals are made with felt nonwoven materials produced with varying percentages of wool and polyester and also on occasions the addition of vinyl or some low friction material. In particular, these seals are usually in the form of rings of felt which may be disposed between the housing and the drum so as to bear against the drum as it rotates. The materials of the ring can interact to form an elastic fit or may be glued into position depending on the arrangement of components.

The seals serve as a friction surface between the rotating drum and the bulkhead sections while also maintaining a seal to hold drying heat within the drum. In particular, the use of seals is desirable to reduce the friction, or prevent the creation of excess friction, between the drum and the bulkhead and to prevent air leakage between the drum and the clothes dryer cabinet which could detrimentally affect the air flow system of the dryer.

The structure of the seals can vary depending on the type, commercial brand and design of the dryer. Many current seals have multi-layered ring structures incorporating a folded over exterior layer such as wool, blend, polyester, or polyester blend nonwoven material. These multi-layered ring structured seals can be folded and stitched to assume different shapes to perform their intended functions within an appropriate dryer design. In some embodiments, a spacer material such as polyester or polyester blend material can also be included that can be held within the folded over exterior. The folded materials can form legs that project outwardly from the folded edge. These legs can have a sealing contacting relationship with the rotating drum. In such seal embodiments, the spacer material can typically be held in place by two seams with a first positioning seam running between an upper edge of the spacer material and one side of the folded over exterior and a second holding seam extending at an inboard position through all three layers so as to establish a coordinated stable structure.

Despite their widespread use in U.S. homes, clothes dryers are involved in a significant number of residential fires. According to some estimates, dryer fires produce annual U.S. property losses approaching $100 million, and lead to multiple consumer deaths and hundreds of injuries. Proper installation and effective maintenance of clothes dryers can significantly reduce the risk of appliance-related fires. But recent research has shown that product construction and design considerations are also important elements in building safer dryers.

The causes of electric dryer fires have been extensively researched over the past decade by the U.S. Consumer Product Safety Commission (CPSC), industry associations including the Association of Home Appliance Manufacturers (AHAM), individual appliance manufacturers, and standards organizations including Underwriters Laboratories (UL). Some research has pointed to the accumulation of lint and the subsequent reduction of air flow as a primary cause of dryer fires. Yet, other testing has supported claims that the cause of dryer fires can be attributed to a number of factors. In particular, studies have found that factors such as a dryer load, a dryer's electrical system, and a dryer's mechanical system also played a major role in reported dryer fires.

While increased consumer education regarding risks with dryer use can help reduce the number of dryer fires, attention can be focused on the design of dryers themselves, and the ability of a dryer unit to actually contain a fire, should one occur. United States (U.S.) fire regulations have been defined by UL Appliance Containment #UL 2158, which requires that a fire in the appliance be contained within the appliance and not allowed to escape into the environment surrounding the appliance. For fires that initiate inside the drum, one potential point of egress is the mating area between the cylinder and the front door and/or rear bulkhead. Clothes dryer fires have a wide temperature range depending on the fuel value of the load plus any fuel value items in the unit construction such as plastic baffles, friction reducing rings, fittings or bulkhead components, etc. The temperatures have been tested to exceed 1300° F. and cycle between low and high values. These temperatures exceed the capability of sustaining structural integrity of traditionally used wool and polyester nonwoven materials, even FR treated polyesters. As such, a need exists for improved dryer seals that can help contain fires that initiate inside of a drum of a clothes dryer.

SUMMARY

The present subject matter provides seals for use in clothes dryers and related methods. In particular, dryer seals are provided that can facilitate containment of drum initiated fires within the dryers in which they are used while still providing friction reduction and air sealing capabilities. Methods related to the manufacture and use of the dryer seals disclosed herein are also provided.

Thus, it is an object of the presently disclosed subject matter to provide dryer seals that have fire retardant and/or fire resistant properties and methods related to such dryer seals. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which:

FIG. 3A illustrates a schematic cross-sectional view of an embodiment of a dryer seal without or prior to application of an embodiment of a high temperature, fire retardant coating according to the present subject matter;

FIG. 3B illustrates a schematic cross-sectional view of the embodiment of a dryer seal according to FIG. 3A with an embodiment of a high temperature, fire retardant coating thereon according to the present subject matter;

FIG. 3C illustrates a schematic cross-sectional view of the embodiment of the fire retardant dryer seal according to FIGS. 3A and 3B disposed within an embodiment of a clothes dryer according to the present subject matter;

FIG. 4A illustrates a schematic cross-sectional view of another embodiment of a dryer seal without or prior to application of an embodiment of a high temperature, fire, retardant coating according to the present subject matter;

FIG. 4B illustrates a schematic cross-sectional view of the embodiment of a dryer seal according to FIG. 4A with an embodiment of a high temperature, fire retardant coating thereon according to the present subject matter;

FIG. 4C illustrates a schematic cross-sectional view of the embodiment of a fire retardant dryer seal according to FIGS. 4A and 4B disposed within an embodiment of a clothes dryer according to the present subject matter;

FIG. 5A illustrates a schematic cross-sectional view of further embodiment of a dryer seal without or prior to application of an embodiment of a high temperature, fire retardant coating according to the present subject matter;

FIG. 5B illustrates a schematic cross-sectional view of the embodiment of a dryer seal according to FIG. 5A with an embodiment of, a high temperature, fire retardant coating thereon according to the present subject matter;

FIG. 5C illustrates a schematic cross-sectional view of the embodiment of a fire retardant dryer seal according to FIGS. 5A and 5B disposed within an embodiment of a clothes dryer according to the present subject matter;

Figure 1:
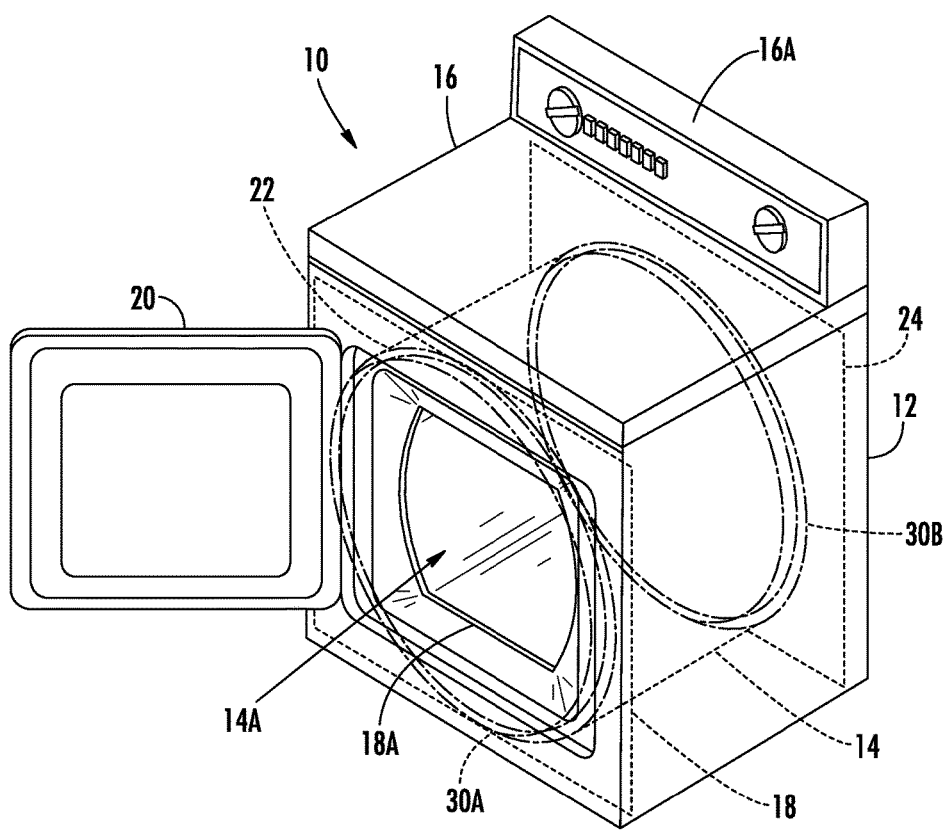
FIG. 1 illustrates a perspective view of an embodiment of a clothes dryer with the rotating drum that includes an embodiment of a seal according to the present subject matter.

Repeat use of reference characters in the present specification and drawings is intended to represent the same or analogous features or elements of the present subject matter.

DETAILED DESCRIPTION

Reference now will be made to the embodiments of the present subject matter, one or more examples of which are set forth below. Each example is provided by way of an explanation of, the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, when a layer or coating is being described in the present disclosure as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements or components within the illustrations as, a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

As used herein, the prefix "nano" refers to the nanometer scale (e.g., from about 1 nm to about 999 nm). For example, particles having an average diameter on the nanometer scale (e.g., from about 1 nm to about 999 nm) are referred to as "nanoparticles". Particles having an average diameter of greater than 1,000 nm (i.e., 1 μm) are generally referred to as "microparticles", since the micrometer scale generally involves those materials having an average size of greater than 1 μm.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5 as examples.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic" is used herein to mean any material formed from a polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

Figure 2:
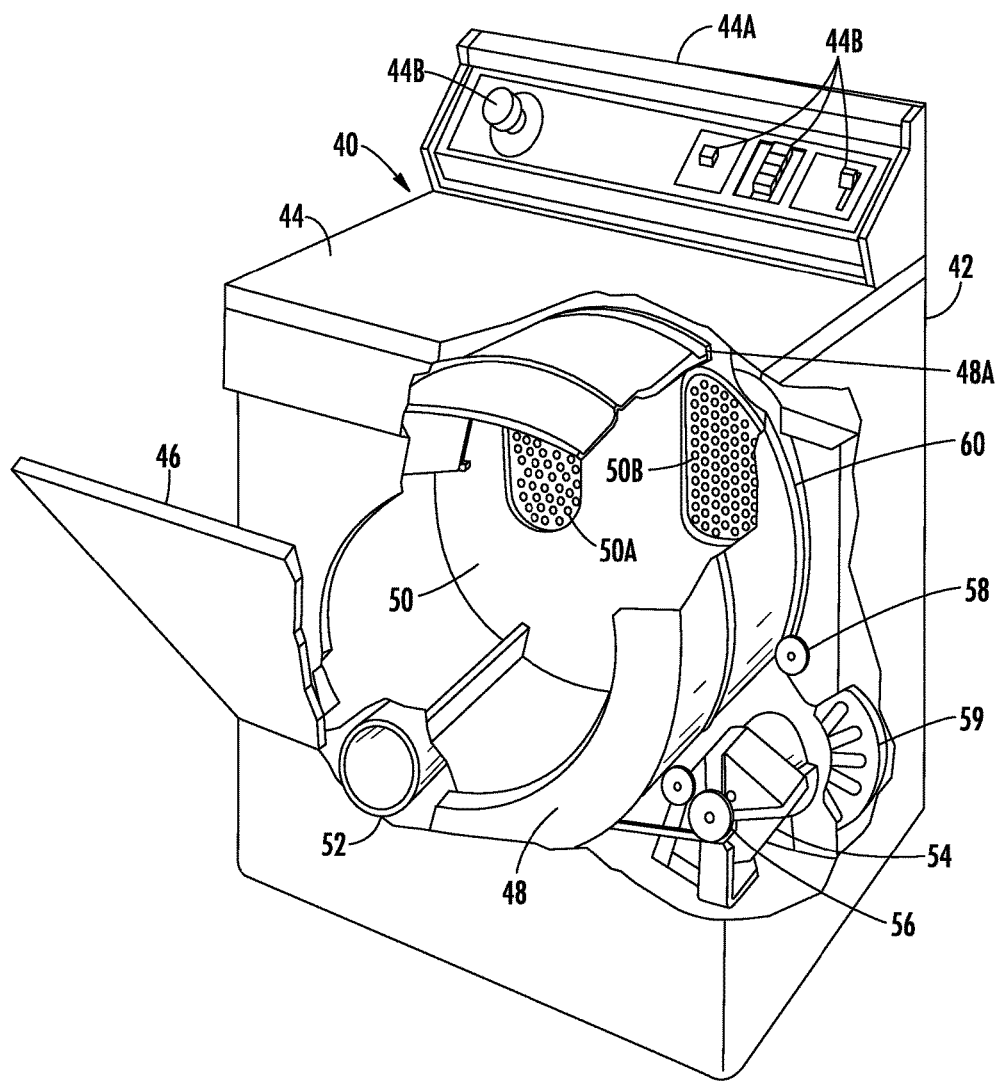
FIG. 2 illustrates a perspective view of another embodiment of a clothes dryer with the rotating drum that uses an embodiment of a seal according to the present subject matter.

Referring now to FIGS. 1 and 2, example embodiments of a domestic clothes dryer are provided that illustrate the general placement and location of dryer seals according to the present disclosure in relation to other components of the respective dryers. In FIG. 1, an embodiment of a dryer 10 comprising, a cabinet body 12 housing a heated rotating drum 14 is provided. As illustrated, cabinet body 12 can comprise a top panel 16 with a control console 16A. The cabinet body 12 can also comprise a front bulkhead 18 (shown in dotted lines) that can include a door opening 18A for loading clothing articles into a mouth 14A of the drum 14. The door opening 18A may be closed by means of a door 20. The front bulkhead 16 of the cabinet body 12 typically can include a front bulkhead flange 22 (shown schematically as the outer front circular dotted line) surrounding the door opening 18 and projecting into the interior of the cabinet body. In such an embodiment, the front bulkhead flange 22 can be disposed generally around a reduced diameter drum opening. Similarly, cabinet body 12 can comprise a rear bulkhead 24 (shown in dotted lines) that can have a rear bulkhead flange (not shown in FIG. 1) projecting into the interior of the cabinet, body and can also be disposed generally around a reduced diameter drum opening.

As shown in FIG. 1, a front seal 30A according to the disclosure herein (shown in dotted circular lines and generally interior to the bulkhead flange 22) can be disposed between the front bulkhead flange 22 of the front bulkhead 18 and a front edge outer wall portion of the drum 14. Similarly, a rear seal 30B according to the disclosure herein (shown in dotted circular lines) can be disposed between the rear bulkhead flange of the rear bulkhead 24 and a rear edge outer wall portion of the drum 14. Since dryers are typically vacuum systems, the seals 30A, 30B in operation can prevent or at least reduce the draw of cool (non-heated) air from around the drum 14. With this flow path blocked, air is drawn more efficiently into the drum 14 from a heated element area for use and eventual vent discharge. Additionally, the seals 30A, 30B can comprise a structure that includes an outer surface that can provide a reduced frictional engagement between the bulkheads 18, 24 and the drum 14. Further, the seals 30A, 30B can comprise a structure, such as a heat-resistant coating, that provides fire retardant properties to the aid in containment if a fire was to ignite in the drum 14. For example, seals 30A, 30B can comprise a coating over at least a portion of the respective seal 30A, 30B that provides or enhances the respective seal's fire retardant and/or fire resistant properties as explained in more detail below.

Referring to FIG. 2, a partial cross-sectional view of a different embodiment of, a clothes dryer 40 is provided that better illustrates an example interior of a clothes dryer. FIG. 2 refers to one type of air flow configuration, an in and out in the rear bulkhead. This is not meant to exclude other air flow paths such as an axial flow where air is either forced or vacuum fed across the heater coils or gas burner, and travels axially to the front panel/bulkhead and exits the drum through the screen and fan. It should be understood that the dryer seal technologies disclosed herein can be used in a variety of, different dryer configurations.

Dryer 40 can comprise a cabinet body 42 with a top panel 44 having a control console 44A along a rear portion thereof incorporating a plurality of controls 448 for selecting an automatic series of drying steps. The cabinet body 42 can have a front door 46 providing access to the interior of a horizontally rotatable drying drum 48. The cabinet body 42 can also have a non-rotating rear bulkhead 50 with air inlets 50A and air outlets 50B therein for charging the interior of the drum 48 with heated air from a heater 52 and for exhausting moisture laden air. In this embodiment of a dryer, an electric motor 54 can be provided to rotate the drum 50 through a pulley arrangement 56 on a plurality of rollers 58. The motor 54 can also drive a fan 59 which provides the air flow through the interior of the drum 48. The rotating drum 48 and the stationary rear bulkhead 50 can have a rear seal 60 extending therebetween. The rear seal 60 can be affixed to a rim 48A of the rotatable drum 48 and can be in frictional engagement with the rotating drum 48 and the stationary rear bulkhead 50. Cabinet body 42 can also comprise a stationary front bulkhead (not shown) with a front seal (not shown) disposed between the front bulkhead and a front rim of the drum 48.

In operation, the rear seal 60 and the front seal (not shown) used in dryer 40 can prevent or at least reduce the draw of ambient air from around the drum 48. Instead air is drawn more efficiently through heater 52 and into the drum 48 through air inlets 50A before being eventually discharged through outlets 50B. As above, the rear seal 60 and the front seal can comprise a structure that includes an outer surface that can provide a reduced frictional engagement between the rear bulkhead 50 and the drum 48 and between the front bulkhead and the drum 48. Further, the rear seal 60 and the front seal can comprise a structure that provides fire retardant and/or fire resistant properties to aid in containment if a fire was to ignite in the drum 48. For example, the rear seal 60 and the front seal can comprise a coating over at least a portion of the respective seal that provides or enhances fire retardant properties of the respective seal as explained in more detail below.

The structure and shape of the seals can be dependent upon the design of the interior of the respective dryer in which the seals are to be used and particularly dependent the designed engagement between the respective bulkheads and the drum used within the dryer. In particular, the drum size, drum opening and rim configuration, the bulkhead shape and configuration can impact, the determination of the construction, structure, and shape of the respective seals as well as the materials used therein. Depending on the design of the respective dryer, the seal for use between the front rim of the drum and the front bulkhead and the seal between the rear rim of the drum and the rear bulkhead can comprise the same or different structure. For example, the seals can be T-shaped cross-sectional seats, U-shaped cross-sectional seals, V-shaped cross-sectional seals, block shaped cross-sectional seals, seals having folds or loops and/or combinations thereof. Further, the seals can comprise different substrate material, different substrate layers and construction principles.

The fire-retardant properties as disclosed herein, however, can still be imparted to most any configuration of dryer seals with the varying of the application and positioning of such properties when taking into consideration the friction reducing and sealing design requirements of the respective seal. Example embodiments of methods of manufacture and seal configurations or structures are provided below as illustrative of the concepts of the dryer seals subject matter disclosed herein.

FIGS. 3A-5C illustrate different example embodiments of dryer seals that can comprise fire retardant properties and their use within a dryer. Referring to FIGS. 3A-3C, an embodiment of a dryer seal, generally designated 70, is provided that can be folded to form a form a U-shaped seal. The dryer seal 70 can comprise a first base substrate 72. The first base substrate 72 can comprise a textile material, such as a woven, nonwoven, and/or a knit as well as, in some embodiments, a film. For example, the first base substrate 72 can be a nonwoven substrate that includes natural fibers, synthetic fibers, or a combination thereof. For example, the first base substrate 72 can comprise a needlepunched nonwoven fabric. A second base substrate 74 can be secured to a portion of the first base substrate 72. The second base substrate 74 can comprise a textile material, such as a woven, nonwoven, and/or a knit as well. The first base substrate 72 and the second base substrate 74 can be secured together in different manners including, but not limited to, sewing, stitchbonding, heat bonding, adhesive bonding, RF welding, ultrasonic welding, or the like.

When configured for installation within a dryer, the dryer seal 70 can be folded along fold 78 to form legs 76 that position the second base substrate within an interior position. As shown in FIG. 3B, a heat resistant coating 75 can be applied over one or more surfaces of the second base substrate 74 that can include inorganic particles and/or additives within a binder material that can provide fire retardant properties. The inorganic particles can comprise a mineral base material that can include, but are not limited to, vermiculite, mica, clay materials, calcium carbonate and the like or a mixture thereof. The additives in the binder material can include but are not limited to intumescent substances. Once coated, the fibers within the coated substrate are protected from the heat and flame, remaining structurally sound during a fire event.

As shown in FIG. 3C, the dryer seal 70 can be secured between a bulkhead BH and a rim DR of a drum so that the legs 76 are positioned between the coated second base substrate 74 and the bulkhead BH as well as the rim DR of the drum. The dryer seal 70 can be attached to the bulkhead BH, with the first base substrate 72 frictionally contacting the rim DR of the drum. The first base substrate 72 and the second base substrate 74 can be elongate substrate strips that can be joined together at their ends to form a circular configuration. In some embodiments, the dryer seal 70 can be used as a front seal as shown in FIG. 3C.

Referring to FIGS. 4A-4C, another example embodiment of a dryer seal, generally designated 80, is provided that can form a form a Y-shaped seal. The dryer seal 80 can comprise a first base substrate 82. The first base substrate 82 can comprise a textile material, such as a woven, nonwoven, and/or a knit as well as, in some embodiments, a film. For example, the first base substrate 82 can be a nonwoven substrate that includes natural fibers, synthetic fibers, or a combination thereof. For example, the first base substrate 82 can comprise a needlepunched nonwoven fabric. The first base substrate 82 can be folded along folds 88 and stitchbonded with stitching 87 to form three legs 86 in a Y formation. A second base substrate 84 can be stitchbonded to a single layered leg 86 of the first base substrate 82. The other legs 86 can comprise a double layer of the first base substrate 82. The second base substrate 84 can comprise a textile material, such as a woven, nonwoven, and/or a knit as well.

As shown in FIG. 4B, a heat resistant coating 85 can be applied over a first surface of the first base substrate 82 that can include inorganic particles and/or additives within a binder material that can provide fire retardant properties. As above, the inorganic particles can comprise a mineral base material that can include, but are not limited to, vermiculite, mica, clay materials, calcium carbonate and the like or a mixture thereof. The additives in the binder material can include but are not limited to intumescent substances. Once coated, the fibers within the coated substrate are protected from the heat and flame, remaining structurally sound during, a fire event. Due to the folding and stitching of the first substrate 82, the heat resistant coating 85 can reside between the double layers of the first substrate 82 of the double layered legs 86. The heat resistant coating 85 can also be on the opposite side of the first substrate 82 where the second base substrate 84 is attached to the first substrate 82. In some embodiments, the second base substrate 84 can additionally or alternatively have a heat resistant coating 85 thereon. In some embodiments, the second substrate 84 may not be included.

As shown in FIG. 4C, the dryer seal 80 can be secured between a bulkhead BH and a rim DR of a drum so that the double layered legs 86 are positioned between the bulkhead BH and the rim DR of the drum. Additionally, the rim DR can be placed between the single leg 86 with the second base substrate 84 thereon and one of the double layered legs 86. The dryer seal 80 can be attached to the rim DR with at least one of the double layered legs 88 frictionally contacting the bulkhead BH. In some embodiments, the dryer seal 80 can be used as a rear seal as shown in FIG. 4C.

Referring to FIGS. 5A-5C, an embodiment of a dryer seal, generally designated 90, is provided that can be folded to form a form a T-shaped seal. The dryer seal 90 can comprise a first base substrate 92. The first base substrate 92 can comprise a textile material, such as a woven, nonwoven, and/or a knit as well as, in some embodiments, a film. For example, the first base substrate 92 can be a nonwoven substrate that includes natural fibers, synthetic fibers, or a combination thereof. For example, the first base substrate 92 can comprise a needlepunched nonwoven fabric. A second base substrate 94 can be secured over a top portion of the first base substrate 92 to form a T-shaped seal with three legs 96. The second base substrate 94 and its securement to the first base substrate 92 can help hold the cross-sectional shape of the seal in the T-shape. As above, the second base substrate 94 can comprise a textile material, such as a woven, nonwoven, and/or a knit as well. In some embodiments, the second base substrate 94 can comprise a woven scrim. For example, the second base substrate 94 can comprise a fiber-glass scrim. In some embodiments, the second base substrate 94 can comprise a nonwoven, such as a needlepunched nonwoven or a point-bonded nonwoven.

The first base substrate 92 and the second base substrate 94 can be secured together in different manners including, but not limited to stitchbonding, heat bonding, adhesive bonding, RF welding, ultrasonic welding, or the like. The first base substrate 92 and the second base substrate 94 can be elongate substrate strips that can be joined together at their ends to form a circular configuration.

In particular, when configured for installation within a dryer, the dryer seal 90 can be folded along fold 98 to form legs 96 that position the second base substrate 94 in an upper exposed position. As shown in FIG. 5B, a heat resistant coating 95 can be applied over one or more surfaces of the second base substrate 94. The heat resistant coating 95 can include inorganic particles and/or additives within a binder material that can provide fire retardant and/or fire resistant properties. As above, the inorganic particles can comprise a mineral base material that can include, but are not limited to, vermiculite, mica, clay materials, calcium carbonate and the like or a mixture thereof. The additives in the binder material can include but are not limited to intumescent substances. Once coated, the coated substrate of the dryer seal can provide protection outside of a dryer that the seal is on from excessive heat and flame that occur within a drum when a fire occurs therein. The coating can also help the dry seal remain structurally sound during a fire event. The dryer seal 90 can be secured to a rim DR of a drum of a dryer so that at least a portion of the dryer seal 90 resides between a bulkhead BH and the rim DR of the drum as shown in FIG. 5C. The first substrate without the coating can contact the bulkhead BH as the drum and seal 90 rotate in the dryer. In some embodiments, the dryer seal 90 can be used as a rear seal as shown in FIG. 5G.

Thus, according to the subject matter disclosed herein, coated fabrics that can comprise at least a portion of a dryer seal may be used alone. Alternatively, the coated fabrics can be laminated, stitched, bonded, or otherwise attached to uncoated materials to produce specific mechanical properties such as strength, wear durability, elasticity, frictional coefficients, air flow, lubricity, bearing surface, axial bearing surface, etc. As stated above and explained in more detail below, the coating can include an intumescent substance and/or a mineral based material. The mineral based material can include but is not limited to vermiculite, mica, clay materials, calcium carbonate and the like or a mixture thereof. Vermiculite is generally known as a hydrated laminar magnesium-aluminum-iron silicate. Due to its crystalline structure, vermiculite expands with the application of heat. The expansion known as exfoliation is the result of the mechanical separation of layers of the vermiculite by the rapid conversion of the contained water into steam. The exfoliated material can then be combined with some form of chemical binder material which can in some instances include, but is not limited to a latex or silicon material. The binder can also comprise intumescent technology whereby the coating will swell and form a multi layered char form when exposed to heat. High carbon char is extremely heat resistant and is widely used in rocket and jet pipe technology. In some embodiments, the binders that comprise one or more intumescent substances can be used with or without a mineral based material. The mineral based material and/or the intumescent substances can, in some embodiments, include nanoparticles and/or microparticles.

The coated fabrics can then be included in a seal to fit the specific drum and bulkhead interface criteria. The seal formation can be accomplished in many ways including sewing, heat bonding, ultrasonic welding, RF welding, etc.

Figure 6:
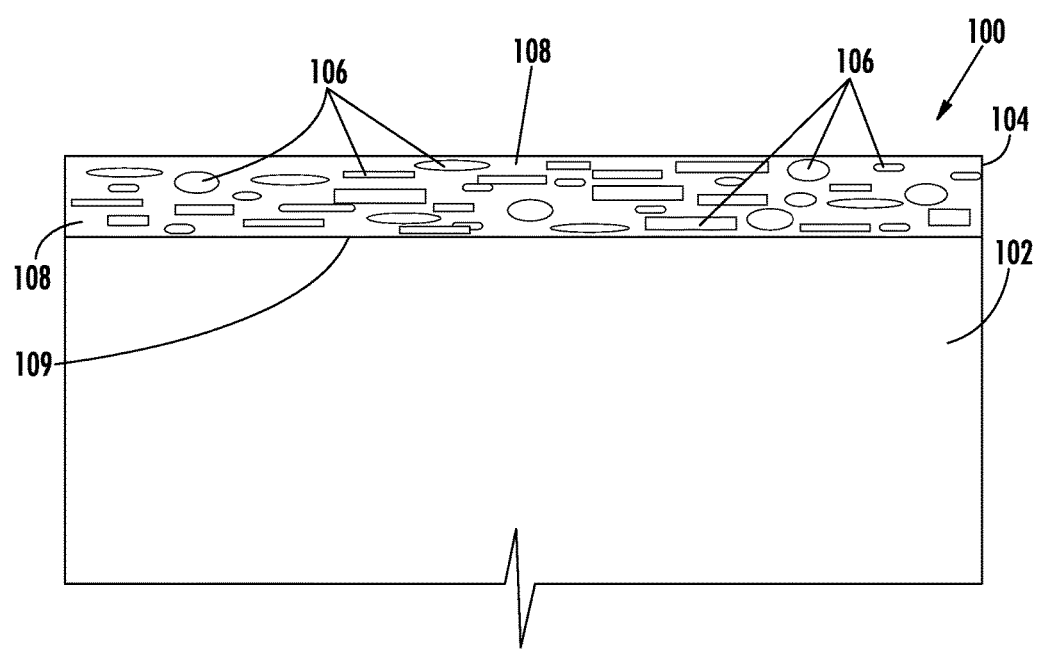
FIG. 6 illustrates a schematic cross-sectional view of a portion of an embodiment of a dryer seal including the heat resistant or fire retardant coating, according to the present subject matter.

As shown in FIG. 6, a portion of a fire retardant dryer seal, generally designated 100, that schematically illustrates a heat resistant coating 104 thereon. Dryer seal 100 can comprise a base substrate 102 that can comprise one or more layers of textile material that can include, but is not limited to nonwoven material, woven material, knitted material, film material or combinations thereof. For example, the base substrate 102 can comprise a nonwoven fabric that can be stitchbonded, heat bonded for example through point bonding. Alternatively, the base substrate can be bonded through ultrasonic welding, RF welding, or like.

The dryer seal 100 can have the heat resistant coating 104 disposed on the substrate 102. In the embodiment shown, the heat resistant coating 104 can generally include particles 106 dispersed within a film-forming binder 108. In some embodiments (not shown), a heat resistant coating 104 can comprise an intumescent substance without the inclusion of particles 106.

In some embodiments, the particles 106 can comprise an inorganic mineral. The inorganic mineral particles 106 can generally serve, collectively, to deflect and/or absorb heat energy applied to the coating so that the underlying fabric layer(s) of the base substrate 102 and/or the surrounding environment outside the drum on which the dryer seal 100 is secured are substantially protected. In particular, the inorganic material can be a higher heat capacity that can absorb the heat from a fire in and around the drum and insulate and deflect the heat so that the temperature on the other side of the coating 104 from the side exposed to the fire or extreme heat is much lower. For example, if the coating 104 is exposed directly to the heat and flames of a fire within a drum of a dryer, the temperature on the side of the base substrate 102 that is opposite of the side on which the coating resides is much lower. As stated above, the inorganic mineral material forming the particles 106 can include, but is not limited to, vermiculite, mica, clay materials, calcium carbonate and the like, or a mixture thereof.

In one particular embodiment, vermiculite can be included (either alone or in combination with another inorganic mineral material) in the heat resistant coating 104. Vermiculite is, as is generally known in the art, a hydrated laminar magnesium-aluminum-iron silicate, which resembles mica in appearance, as both contain silicate sheets. Due to its crystal structure, vermiculite expands with the application of heat. The expansion, known as exfoliation, is the result of the mechanical separation of the layers within vermiculite by the rapid conversion of contained water to steam. Without wishing to be bound by any particular theory, it is believed that this expansion mechanism serves to absorb a large portion of the heat applied to the coating, resulting in the underlying fabric or the environment on the opposite side of the expanded coating from the fire or extreme heat being, sufficiently protected from that heat. Thus, the resulting coating fabric is particularly suitable for enduring the quick exposure to heat, for example, from a flash fire within a dryer, to protect the underlying fabric or the environment on the opposite side of the expanded coating from the fire and its heat.

Prior to preparing the heat resistant coating, the inorganic mineral material (e.g., vermiculite) can be chemically exfoliated and/or granulated to form delaminated platelets. Any method of granulation can be used to obtain the desired size. As particles, the inorganic material can be dispersed within a suitable solvent system. The solvent system generally includes at least one solvent that is configured to disperse the inorganic particles in a substantially homogeneous manner (particularly upon mixing) so that a substantially uniform coating can be formed therefrom. In one embodiment, the solvent system can include water, an alcohol (e.g., methanol, ethanol, propanol, etc.), an organic solvent, or mixtures thereof.

In one particular embodiment, the inorganic particles 106 may, generally, have a plate-like shape in that each particle's thickness is less than the width and/or length. This particular shape of the particles 106 can be formed via granulation and/or exfoliation as discussed above. For instance, each particle 106 can have a thickness that is at least about 10 times less than the largest dimension of the particle. For example, the particles 106 can have an aspect ratio (width/length:thickness) of between about 500:1 to about 1000:1.

For example, the particles 106 may have an average thickness of less than about 50 nm, such as about 0.1 nm to about 50 nm when exfoliated. Alternatively, the particles 106 may have a larger dimension of about 0.5 μm to about 50 μm. For instance, the particles 106 may have a diameter or a greater dimension (in length or width) in the range of from about 10 μm to about 40 μm. As such, in certain embodiments, the particles 106 may have an average thickness of about 0.5 nm to about 10 nm, and may have a larger dimension of about 10 μm to about 40 μm (e.g., width and/or length). In one particular embodiment, the particles 106 can have an average size of about 1 nm to about 2 nm in its thickness while having an average diameter or larger dimension in width or length of about 20 μm to about 40 μm.

Such a relatively small particle size can allow for a relatively large surface area of the mineral material for absorbing and/or dispersing heat applied thereto. Additionally, the use of such relatively small particles allows the coating to remain flexible.

The film-forming binder 108 generally serves to adhere and hold the particles 106 in place within the heat resistant coating 104 on the base substrate 102. Thermal set or thermoplastic binders can be utilized to facilitate the coating process. Such binder materials include, but are not limited to, acrylic resins, styrene-butadiene rubber (SBR), polyvinyl alcohol, ethyl vinyl acetate resins, phenolic resins, etc., and combinations thereof. Additionally, other types of substances can be included in the binder 108.

A binder 108 can adhere to a portion of the dryer seal 100 to provide heat resistance, fire retardancy, and/or fire resistance to the dryer seal 100 while the dryer seal 100 still provides friction reduction and/or sealing capabilities. Regarding its fire resistance capabilities, the binder 108 can be formulated to include certain desired properties. Such properties, for example, can include, but are not limited to, having a low flame spread; having low smoke toxicity; providing thermal insulation protection; providing long term protection from heat and flame; having a low smoke production; easy application; good wear resistance; adherence to the desired base substrate; and the appropriate flexibility after application to permit the dryer seal to perform its intended functions.

In some embodiments, binder 108 can comprise an intumescent coating which can fulfill many of these properties. An intumescent is a substance that swells as a result of heat exposure, thus increasing in volume and decreasing in density. The term intumescent when applied to fire protective coatings refers to a technology wherein the coating will swell and form a multi-layered char foam when exposed to heat. High carbon containing chars are extremely heat resistant and can be employed in critical high temperature applications such as the carbon on carbon composites that are machined to produce rocket exhaust nozzles. The production of these carbon on carbon composites involves the combination of graphite fibers with high char yield epoxies. After curing, these parts are graphitized in a high-pressure autoclave at high temperatures. Intumescent materials can be thermally stable to above 1,000° C. (1,832° F.). With the right choice of materials, intumescent coatings can produce a low thermally conductive char foam. Thus, a coating 104 that includes an intumescent substance can form a char foam that has a low thermal conductivity when exposure to fire and/or extreme heat.

Soft char intumescent substances can produce a light char that is a poor conductor of heat, thus retarding heat transfer. Typically, these intumescent substances can also contain a significant amount of hydrates. As the hydrates are spent, water vapor is released, which has a cooling effect. Once the water is spent, the insulation characteristics of the char that remains can slow down heat transfer from the exposed side to the unexposed side of a dryer seal 100 that includes a coating 104. Typically, the expansion pressure that is created for these products is very low, because the soft carbonaceous char has little substance, which is beneficial if the aim is to produce a layer of insulation. Harder char intumescent substances can be produced with sodium silicates and graphite. These intumescent substances can produce a more substantial char capable of exerting quantifiable expansion pressure. For example, in some embodiments, such intumescent substances can be used as at least a portion of the binder 108 and the inorganic particles can comprise a vermiculite material as discussed above in the dryer seal 100.

While not being bound by any particular theory, it is contemplated that if a fire was to ignite in a drum, the heat resistant coating 104 on the dryer seal 100 could expand to effectively restrict the air flow into drum of the clothes dryer between the drum rim and the bulkheads. For example, in some embodiments, the air flow can be restricted to between about 15 cubic feet per minute (cfm) to about 30 cfm. This expansion can have the effect of starving any fire or potential flame so that the combustible material within the drum only smolders and does not ignite into flame and/or stay ignited. Further, the fire can be prevented from propagating through the dryer seal. This effect combined with the insulative qualities of both such a binder 108 and inorganic particles 106 in heat resistant coating 104 can increase the effectiveness of the ability of the dryer seal to facilitate containment of dryer fires within the cabinet body.

For example, the intumescent substances that can be included within the binder 108 when activated by heat to expand, i.e., char, can have a restricted air permeability of between about 15 and about 30 cfm which permits fire inside the drum to be contained, smoldering and slowly consuming the combustible material but not permitting sufficient oxygen to enter the drum and create a more violent and high temperature fire. Tests have been conducted within a drum of clothes dryers and/or apparatuses that simulate the interior chamber of a drum, of a clothes dryer that indicate that a combustion event will not exceed a maximum temperature of 800° F. when a intumescent material within a binder 108 on a dryer seal is activated. Without the intumescent, the temperatures within the drum of clothes dryers and/or apparatuses that simulate the interior chamber of a drum of a clothes dryer can reach and exceed 1,250° F.

In particular for some embodiments of the heat resistant coatings 104 in which the binders 108 comprise an embodiment of one or more intumescent substances, the chemistry of char formation can provide a classic dehydration reaction between hydroxyls, carboxylic acids and amines or amine groups to form polymeric linkages. The dehydration reaction requires heat and can be enhanced by an acid catalyst. Water and ammonia can be liberated during these reactions. Some such substances can contain oxygen or nitrogen on every carbon and have a natural propensity for char formation. Examples can include starches and sugars. Intumescent substances can comprise amino phosphates or amino sultanates that, upon heating, can liberate phosphoric or sulfonic acid to catalyze the dehydration reaction and ammonium ions to facilitate char formation. In some embodiments, polymeric substances without an aliphatic carbon chain can be used as at least a portion of such binders 108. Intumescent materials that have more nitrogen and oxygen on the hydrocarbon chains can be more desirable.

Commercial examples of an intumescent substance that are available include INTUMAX manufactured by Broadview Technologies, Inc. located in Newark, N.J. Such intumescent agents can allow the use of less intumescent agent in a binder's formulation, which, in turn, can improve the physical and adhesive properties of the coatings. Many others sources of intumescent substances that can be added to binder materials are available.

To formulate intumescent coatings several additional chemistry considerations can be considered. For example, higher amounts of oxygen and nitrogen on carbon can make it easier to produce a char. In addition, the more double bonds the less heat will be released during the initial burning stage. Also, the temperatures at which dehydration and de-hydrogenation reactions occur vary for different polymers. The choice of an intumescent substance can affect the release of acid catalyst, oxygen addition catalyst and recombinant ammonium ions. In some embodiments, the intumescent substance used can release acid catalyst, oxygen addition catalyst and recombinant ammonium ions close in time to or simultaneously with the dehydrogenation and dehydration reactions.

Other considerations involve the melt flow rheology, the char height and char strength. There are also the conventional formulation considerations having to do with everything from thixotropic behavior to flexibility and everything in between. The formulation of the binder 108 that include one or more intumescent substances can be such that the formulation can help char properties not hurt them. For example, since char layers remain on the surface, wetting agents and defoamers that reduce surface tension may want to be avoided. Certain fillers, can have synergistic benefits. The particles 106 can comprise ceramic and phenolic micro spheres that can add to the thermal insulative properties. Intumescent substances can be added to binder materials such as, but not limited to, acrylic resins, styrene-butadiene rubber (SBR), polyvinyl alcohol, ethyl vinyl acetate resins, phenolic resins, etc., and combinations thereof.

These binder materials can be modified as desired to crosslink (e.g., with a crosslinking agent, such as melamine formaldehyde) or to change other characteristics such as hydrophobicity, hydrophilicity, viscosity, pH, etc. As such, other materials and components can be included within the heat resistant coating 104. For example, waxes, plasticizers, rheology modifiers, antioxidants, antistats, antiblocking agents, and other additives may be included as desired. Surfactants may be added to help disperse some of the ingredients, especially the film-forming binder within the solvent system. When present, a surfactant(s) can be included in the heat resistant coating up to about 20%, such as from about 0.5% to about 5%. Exemplary surfactants can include nonionic surfactants and/or ionic surfactants.

A plasticizer may also be included in the heat resistant coating 104. A plasticizer is an additive that generally increases the flexibility of the final coating by lowering the glass transition temperature for the binder (and thus making it softer). In one embodiment, the plasticizer can be present in the heat resistant coating 104 up to about 25%, such as from about 5% to about 20%, by weight. Likewise, viscosity modifiers can be present in the heat resistant coating. Viscosity modifiers are useful to control the rheology of the coatings in their application. A particularly suitable viscosity modifier is high molecular weight poly(ethylene oxide). The viscosity modifier can be included in any amount to help the coating process, such as up to about 5% by weight, such as about 0.5% to about 3% by weight.

To form the fire retardant portion of the dryer seal 100, the particles 106 of inorganic material can be combined with the film-forming binder 108 to form a coating/paste, which can then be wet-laid onto a surface 109 of the base substrate 102 and dried to form the coating 104. For example, the particles 106 can be combined as dry particles or dispersed within a solvent system, as discussed above. After drying, the inorganic material of the particles 106 can constitute about 0.5% by weight to about 99.5% by weight of the total weight of the heat resistant coating 104 (e.g., about 50% by weight to about 95% by weight).

Depending on the level of heat shielding desired for a particular application, the thickness of the heat resistant coating 104 can be varied along with the type of inorganic material included in the particle 106 and/or the concentration of particles 106 in the coating 104. In most embodiments, the thickness of the heat resistant coating 104 can be about 10 μm to about 1 mm (e.g., about 10 μm to about 100 μm).

In some embodiments, a single application of the heat resistant coating 104 on the base substrate 102 may be sufficient. However, multiple applications are available and can be applied using the method as described above. Thus, the presently described dryer seal 100 is not limited to a single layer of the heat resistant coating 104 on a substrate 102 of the dryer seal 100.

FIGS. 7A-7D illustrate one specific embodiment of a dryer seal, generally designated 110, that includes a folded over elongate exterior base substrate 116 and one or more elongate interior base substrates 118. The dryer seal 110 can have a substantially circular construction. According to some embodiments, the dryer seal 110 is formed by adjoining the opposing ends of an elongate sealing structure 112 by use of end to end stitching 114 or other attachment means such as ultrasonic welding and, the like as may be known to those of skill in the art.

According to some embodiments, the sealing structure 112 can be formed by folding an interior base substrate 118 and then by folding an outer base substrate 116 around the folded interior base substrate 118 and applying a securement line 120 through the layered structure 112 to secure the components in place relative to one another. As illustrated, the stitch line 120 can be disposed at an inboard location relative to the folded over edge of the outer layer 116. Such an arrangement thereby forms a single bulbous pocket structure 124 in which a proximal end 122 of the fold of the interior base substrate 118 is held.

In some embodiments, one or more separate interior base substrates 118 can be inserted into a pocket formed by a folded outer base substrate 116. In some embodiments, one or more of the separate interior base substrates 118 can be folded. In such embodiments, the other separate interior base substrates 118 can be unfolded. In some embodiments, all of the one or more interior substrates 118 can be unfolded. In some embodiments, the outer base substrate 116 can comprise two outer base substrates 116 secured together along one side to form an elongate pocket in which one or more interior base substrates 118 can be inserted and secured therein.

The outer base substrate 116 can comprise a textile material, such as a woven, nonwoven, and/or a knit as well as, in some embodiments, a film. According to some embodiments, the outer base substrate 116 can be a needle punched nonwoven textile material formed from entangled fibers of wool, polyester, other synthetic fiber, or blends thereof. In one exemplary construction the outer base substrate 116 is a needle punched grey wool felt or wool/polyester blend felt having a thickness of about 0.13 inches. However, it is likewise contemplated that other materials, sizes, and/or constructions may be utilized if desired.

The interior base substrate 118 can also comprise a textile material, such as a woven, nonwoven, and/or a knit as well as, in some embodiments, a film. According to some embodiments, the interior base substrate 118 can be a needle punched nonwoven textile material. In some embodiments, the interior base substrate 118 can comprise a point-bonded nonwoven sheet. For example, the substrate 118 can comprise polyester or other synthetic fibers. In some embodiments, this interior base substrate 118 can be needle punched polyester having a thickness of about 0.17 inches and a mass per unit area of about 12 ounces per square yard. However, it is likewise contemplated that other materials, sizes, and/or constructions may be utilized if desired.

The securement line 120 which defines the inboard boundary of the pocket 124 can be formed by heat bonding, adhesive bonding, ultrasonic welding, RF welding, stitching, such as a chain stitch or lock stitch construction, or the like. In one example construction, the securement line 120 comprises a stitch line that can incorporate a stitch density of about 5 to about 13 stitches per inch. However, it is likewise contemplated that other stitching arrangements and/or welding or bonding arrangements may be utilized if desired. The stitch joints formed can exceed the tear strength of the felt, or other type of base substrate 116.

Figure 7A:
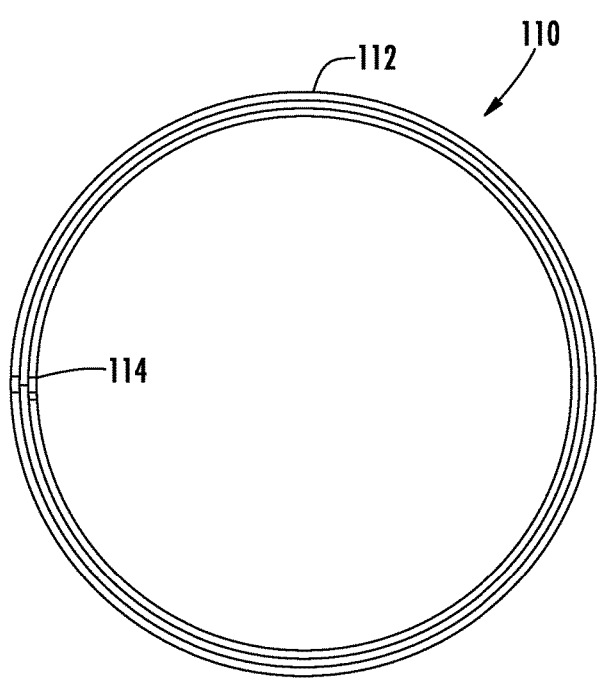
FIGS. 7A-7C illustrate respectively schematic front plan, side plan and cross-sectional views of another example embodiment of a front dryer seal according to the present subject matter.
Figure 7B:
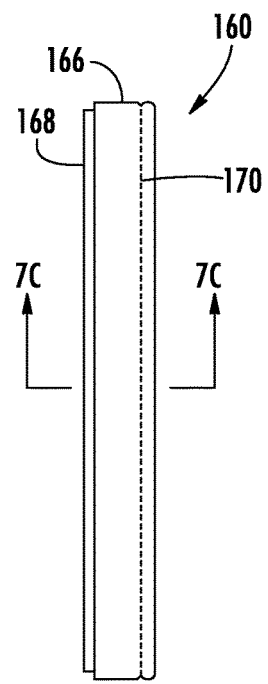
Figure 7C:
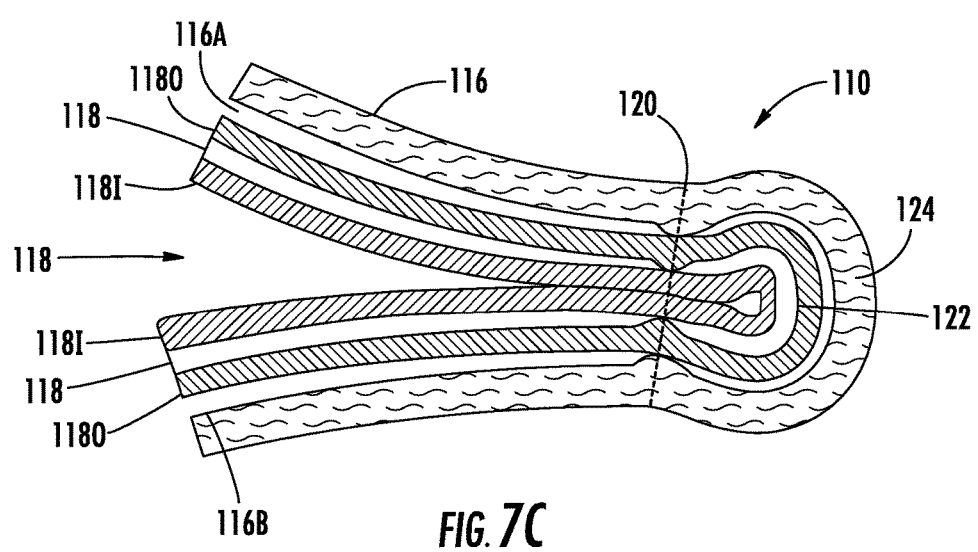

As shown in FIG. 7C, outer base substrate 116 can have interior surfaces 116A and 116B and folded interior base substrate 118 can comprise an inner surface and an outer surface. The inner surface of interior base substrate 118 can have a heat resistant coating 118I thereon, and the outer surface of the interior base substrate 118 can also have a heat resistant coating 118O thereon. The heat resistant coating 118I, 118O can be fire retardant and/or fire resistant. Heat resistant coatings 118I and 118O can and can include inorganic particles dispersed within a binder material as described above. Because the interior base substrate is folded, there can be effectively two inner layers of heat resistant coating 118I and two outer layers of heat resistant coatings 118O. Thus, in such embodiments, four layers of heat resistant coatings can reside between the interior surfaces 116A, 116B of the outer base substrate 116. Due to the thinness of the heat resistant coating layers (which are exaggerated in the FIG. 7C), multiple layers of the heat resistant coating should not interfere with the other operational aspects of sealing and friction reduction of the dryer seal 110. Due to the folded substrates, dryer seal 130 can have multiple legs.

Further, additionally or alternatively, at least one of interior surfaces 116A, 116B of the outer base substrate 116 can have a heat resistant coating thereon that is fire retardant and/or fire resistant. In some embodiments, the interior base substrate 118 can be unfolded such that two layers of heat resistant coating reside between interior surfaces 116A, 116B of the outer base substrate 116. In some embodiments, a single surface of an unfolded interior base substrate 118 can have a heat resistant coating thereon so that one layer of heat resistant coating resides between interior surfaces 116A, 116B of the outer base substrate 116. Other similar configurations are contemplated.

Figure 7D:
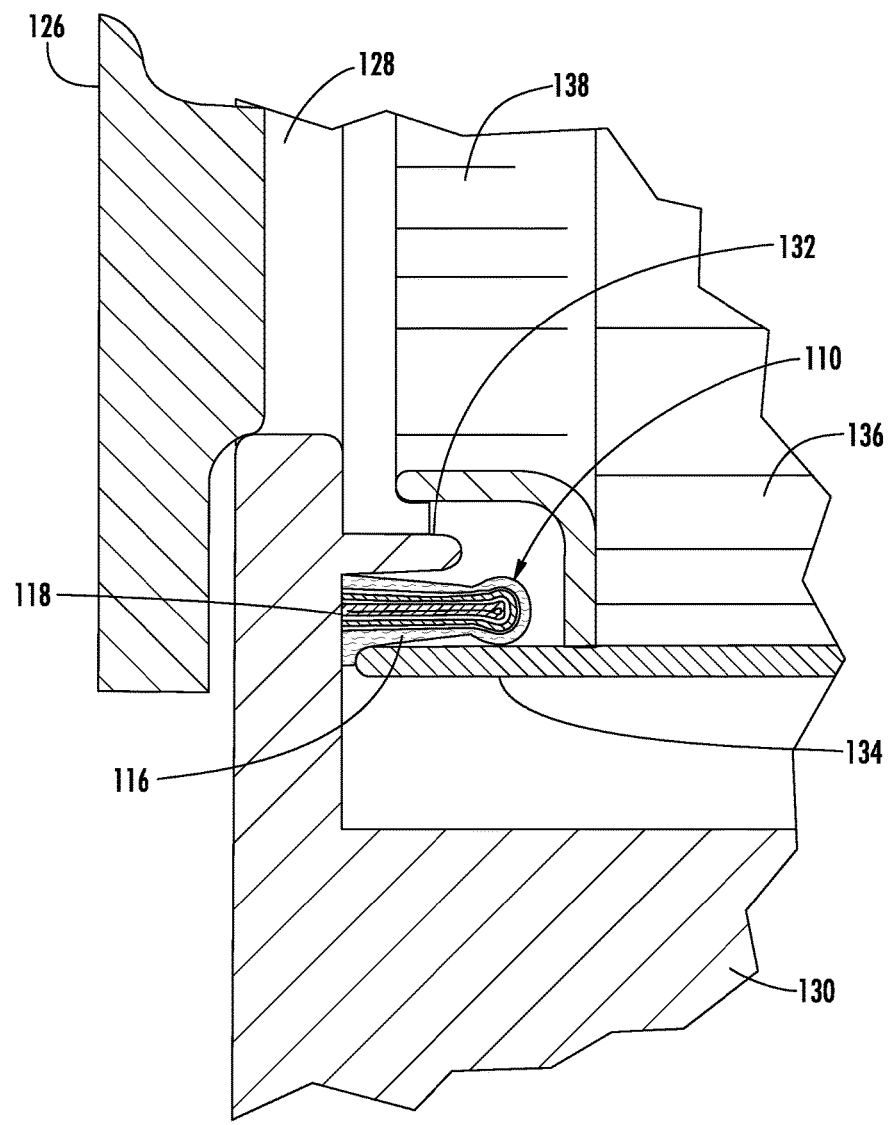
FIG. 7D illustrates a schematic cross-sectional view of the embodiment of the front dryer seal according to FIGS. 7A-7C disposed within an embodiment of a clothes dryer according to the present subject matter.

As shown in FIG. 7D, the dryer seal 110 can be placed in a dryer 130, for example, between a front bulkhead flange 132 and an outer wall portion 134 of a rotatory drum 136. The placement of dryer seal 110 can thus be on an outside perimeter of the mouth 128 in the front bulkhead and the mouth 138 in the drum 136. The mouth 128 at the front bulkhead can be opened and can be sealable closed by a door 126. As the dryer is operated the drum 136 may experience a degree of oscillation up and down. The outer base substrate 116 and the interior base substrate 118 define legs which may flair out or compress as required to adjust for this up and down oscillation and thereby maintain contacting sealing relation with the moving drum 136. If a fire was to ignite in the interior of dryer 130 or the drum 136, the heat resistant coatings on the one or more interior surfaces of the outer base substrate 116 and the interior base substrate 118 can provide insulation against the heat and flames of the fire and, in some instances, can facilitate the smothering of the fire within the dryer 130.

Figure 8:
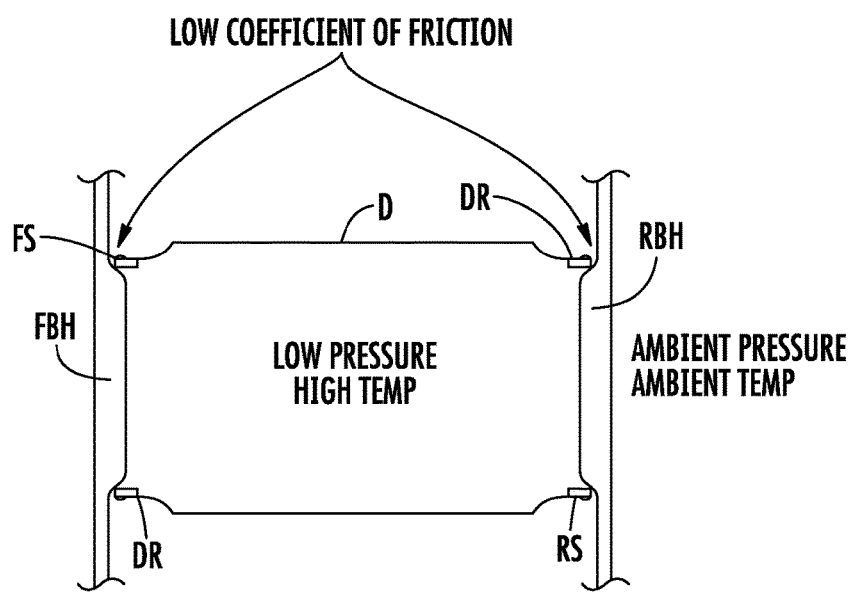
FIG. 8 illustrates a schematic cross-sectional view of a drum portion of a clothes dryer using one or more embodiments of fire retardant dryer seals according to the present subject matter showing the temperature differential across the seals.

FIG. 8 shows a schematic of a dryer having a front bulkhead FBH and a rear bulkhead RBH with a drum D placed therebetween. A front dryer seal FS that is treated with a heat resistant coating as described above can be located between the front bulkhead FBH and a front drum rim DR of the drum D. Additionally, a rear dryer seal RS that is treated with a heat resistant coating as described above can be located between the rear bulkhead RBH and a rear drum rim DR of the drum D. For example, the dryer seals FS and RS can be attached to the drum rims DR of the drum D. As shown in FIG. 8, dryer seals FS and RS can insulated the interior of the drum D to main the temperature differential and pressure differential between the interior of the drum and the environment surrounding the dryer, even when a fire has ignited within the drum D. Further, due to the properties of the inorganic particles and, possibly, the properties of certain additives to the binder material of the heat resistant coating, air supply can be restricted by the swelling of the coated surfaces of the dryer seals FS and RS to help smother any fire within the drum D.

Figure 9:
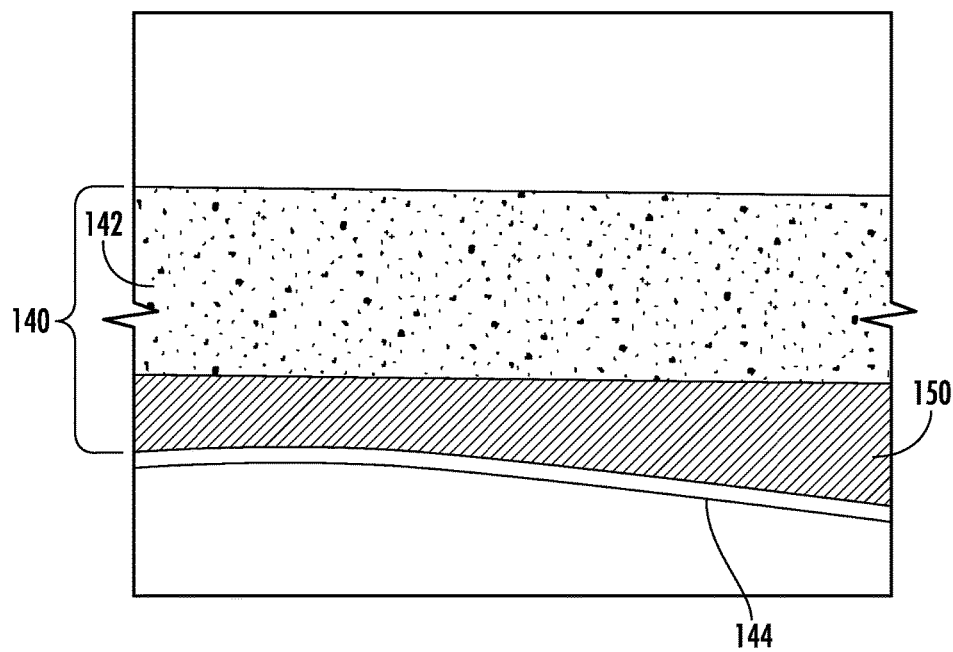
FIG. 9 illustrates a perspective view of a portion of a further example embodiment of a fire retardant dryer seal according, to the present subject matter.

FIG. 9 illustrates a portion of another embodiment of dryer seal 140 with a first base substrate 142 comprising a nonwoven material, such as a needlepunched polyester nonwoven fabric and a second base substrate 144 also comprising a nonwoven material, such as a needlepunched polyester nonwoven fabric. A surface of the second base substrate 144 can have one or more thin layers of a heat resistant coating 150 applied thereto. The dryer seal 140 can be folded when in use so that the heat resistant coating 150 is on an interior portion of the folded dryer seal and not on a surface that necessarily provides a frictional engagement as the drum rotates within the dryer.

Figure 10A:
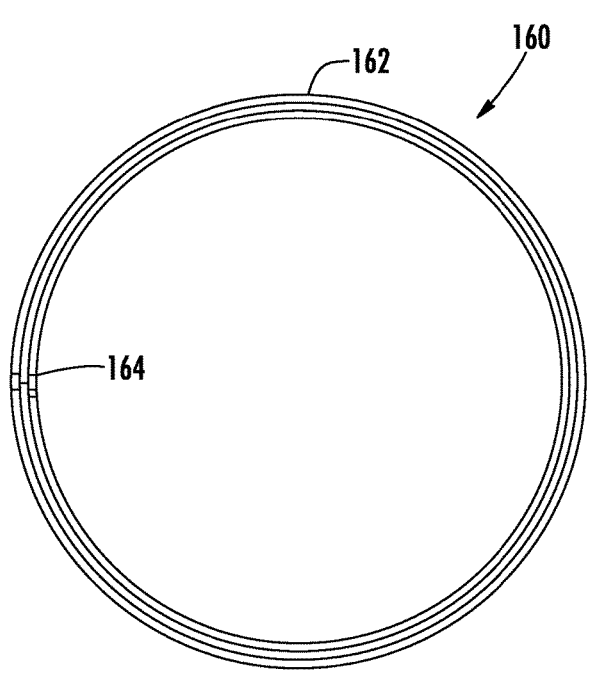
FIGS. 10A-10B illustrate a respective schematic front plan view and side plan view of other example embodiments of a front dryer seal according to the present subject matter.
Figure 10B:
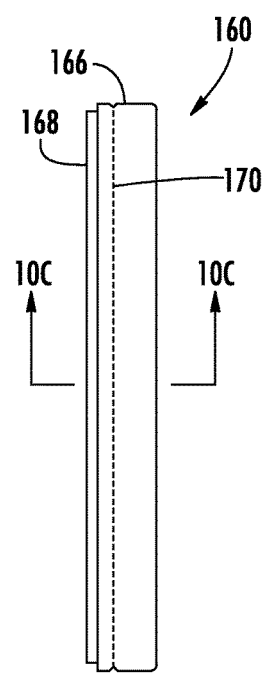

FIGS. 10A-10B illustrate another embodiment of a dryer seal, generally designated 160, that includes a folded over elongate exterior base substrate 166 and one or more elongate interior base substrates 168. The dryer seal 160 can have a substantially circular construction. According to some embodiments, the dryer seal 160 is formed by adjoining the opposing ends of an elongate sealing structure 162 by use of end to end stitching 164 or other attachment means such as ultrasonic welding and the like as may be known to those of skill in the art. As shown in FIG. 10B, a securement line 170 can be applied at a distance away from the folded of the exterior base substrate 166 close to the open side of the exterior base substrate 166 into which the one or more elongate interior base substrates 168 is inserted.

According to some embodiments, the sealing structure 162 can be formed by folding an outer base substrate 166 around the one or more interior base substrate 168 and applying the securement line 170 to the layered structure 162 to secure the components in place relative to one another. As illustrated, the securement line 170 comprises a stitch line that can be disposed at an inboard location relative to the folded over edge of the outer base substrate 166. Such an arrangement thereby forms a single pocket structure 174 in which a proximal end 172 of the one or more interior base substrates 168 is held. Different embodiments of dryer seal 160 using a similar sealing structure 162 are shown in FIGS. 10C-10G and described below.

Figure 10C:
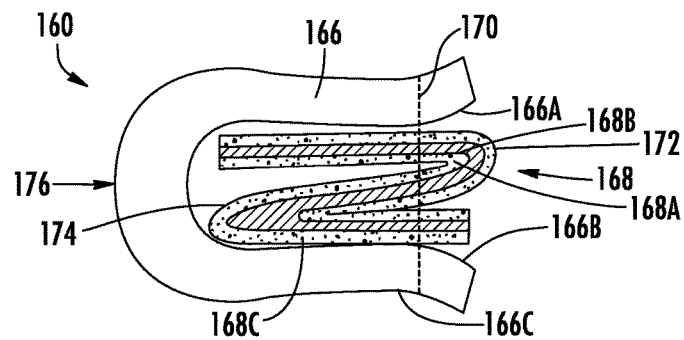
FIGS. 10C-10G illustrate respective schematic cross-sectional views of example embodiments of a front dryer seal having a similar configuration as the front dryer seal illustrated in FIGS. 10A-10B according to the present subject matter.

Referring to FIG. 10C, a cross-sectional view of a dryer seal 160 is provided that includes a single interior base substrate 168 that is folded at two locations to form a z-fold. A first surface of the interior base substrate 168 has a heat resistant coating 168A thereon. Similarly, a second surface on a side of the interior base surface 168 opposite the first surface has a heat resistant coating 168B thereon. The heat resistant coating 168A, 168B can comprise a coating composition as described above. The z-folded interior base substrate 168 is inserted into the pocket 176 formed by the exterior base substrate 166. In particular, an end 174 of the folded interior base substrate 168 is inserted toward the pocket end 176 formed by the fold of the outer base substrate 166 with an end 172 of the folded interior base substrate 168 extending from the open end of the exterior base substrate 166. The z-fold of the interior base substrate 168 thereby provides multiple layers of heat resistant coatings between interior surfaces 166A, 166B of the folded outer base substrate 166. In particular, six different heat resistant coating layers can be provided between interior surfaces 166A, 166B of the folded outer base substrate 166. When installed in a dryer, the outer surfaces 166C formed by the folded outer substrate 166 can contact the rim of the drum and bulkhead within the dryer. Thereby, the outer surfaces 166C formed by the folded outer substrate 166 can provide a friction-reducing surface between the rotating drum and the bulkhead sections while also maintaining a seal to hold drying heat within the drum. It is understood that the folded interior base substrate 168 can be inserted by the other end into the folded outer base substrate 166 to form an s-fold.

Figure 10D:
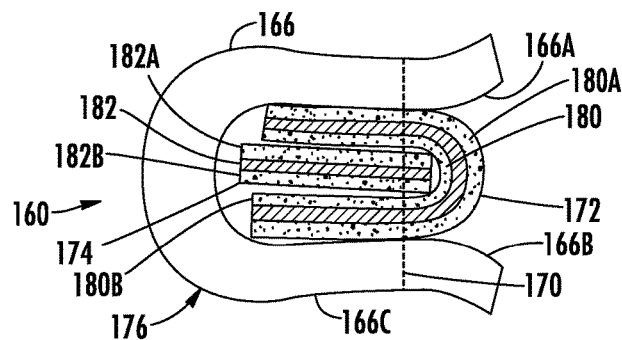
Figure 10E:
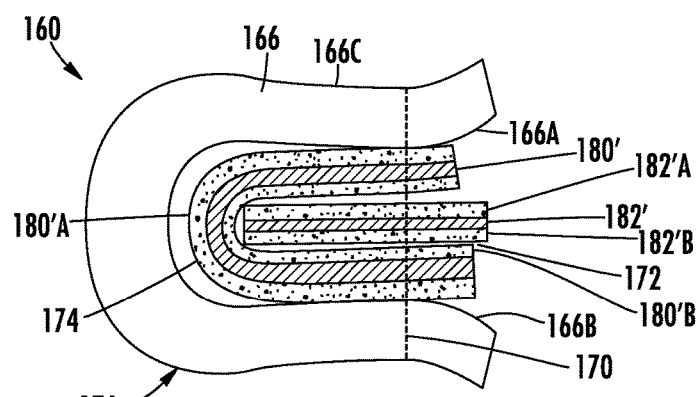

FIGS. 10D and 10E illustrate similar embodiments of a dryer seal 160 that use two interior base substrates 180, 180' and 182, 182' that can be inserted within a folded outer base substrate 166. In FIG. 10D, a first interior base substrate 180 with a first surface covered with a heat resistant coating layer 180A and a second surface covered with a heat resistant coating layer 180B can be folded in to a U-shape or a V-shape. A second interior base substrate 182 with a first surface covered with a heat resistant coating layer 182A and a second surface covered with a heat resistant coating layer 182B can be inserted into the fold of the first interior base substrate 180 that can then be inserted into the folded outer base substrate 166 between interior surfaces 166A, 166B. The end 172 that extends out of the opening of the folded outer base substrate 166 can be the folded portion of the first interior base substrate 180, while the open portion of the first interior base substrate 180 and the second interior base substrate 182 form the end 174 that extends into the folded outer base substrate 166 proximate to the pocket end 176.

In the embodiment of a dryer seal 160 shown in FIG. 10E, a first interior base substrate 180' with a first surface covered with a heat resistant coating layer 180'A and a second surface covered with a heat resistant coating layer 180'B can be folded in to a U-shape or a V-shape. A second interior base substrate 182' with a first surface covered with a heat resistant coating layer 182'A and a second surface covered with a heat resistant coating layer 182'B can be inserted into the fold of the first interior base substrate 180'. Both the first interior base substrate 180' and the second interior base substrate 182' can then be inserted into the folded outer base substrate 166 between interior surfaces 166A, 166B. The end 172, though, that extends out of the opening of the folded outer base substrate 166 can be the open portion of the first interior base substrate 180' and the second interior base substrate 182', while the folded portion of the first interior base substrate 180 forms the end 174 that extends into the folded outer base substrate 166 proximate to the pocket end 176.

In the embodiments of a dryer seal 160 shown in FIGS. 10D and 10E, the two interior base substrates 180, 180' and 182, 182' of each respective embodiment provides multiple layers of heat resistant coatings between interior surfaces 166A, 166B of the folded outer base substrate 166. In particular, six different heat resistant coating layers can be provided between interior surfaces 166A, 166B of the folded outer base substrate 166. As above, when installed in a dryer, the outer surfaces 166C formed by the folded outer substrate 166 can contact the rim of the drum and bulkhead within the dryer.

Figure 10F:
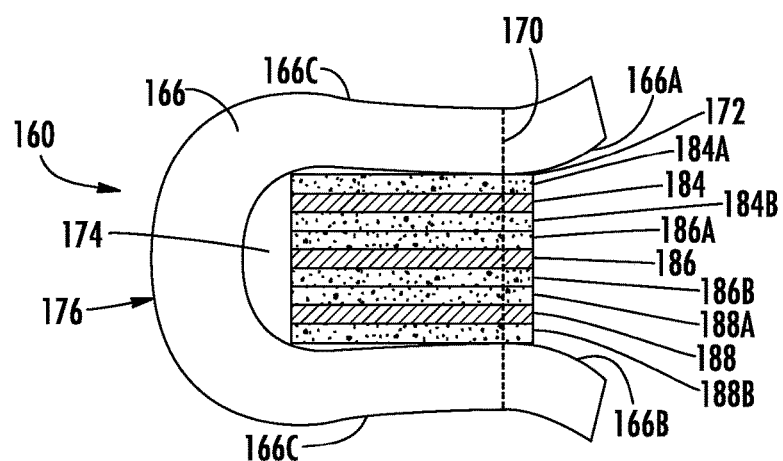

Referring to FIG. 10F, three separate interior base substrates 184, 186 and 186 can be inserted within a folded outer base substrate 166 to form the dry seal 160 schematically depicted therein. In particular, three separate interior base substrates 184, 186 and 186 each with a first surface covered with a respective heat resistant coating layer 184A, 186A, 188A and a second surface covered with a respective heat resistant coating layer 184B, 186B, 188B stack upon one another and inserted into the folded outer base substrate 166 forming an end 174 proximal the pocket end 176 of the folded outer base substrate 166 and an end 172 extending from the open end of the folded outer base substrate 166. Thereby, the three separate interior base substrates 184, 186 and 186 provides multiple layers of heat resistant coatings between interior surfaces 166A, 166B of the folded outer base substrate 166. In particular, six different heat resistant coating layers can be provided between interior surfaces 166A, 166B of the folded outer base substrate 166 with the outer surfaces 166C formed by the folded outer base substrate 166 configured to contact the rim of the drum and bulkhead within the dryer.

Figure 10G:
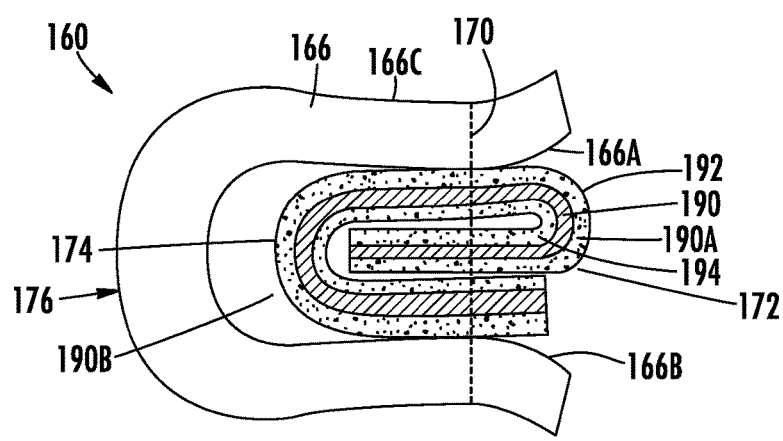

FIG. 10G illustrates an embodiment of a dryer seal 160 similar to the embodiment shown in FIG. 10C. A cross-sectional view of a dryer seal 160 is provided that includes a single interior base substrate 190 that is folded at two locations to form a tri-layered insert. A first surface of, the interior base substrate 190 has a heat resistant coating 190A thereon. Similarly, a second surface on a side of the interior base surface 190 opposite the first surface has a heat resistant coating 190B thereon. The heat resistant coating 190A, 190B can comprise a coating composition as described above. The double-folded interior base substrate 190 is fold in upon itself and is inserted into the pocket 176 formed by the exterior base substrate 166. In particular, an end 174 of the folded interior base substrate 190 is inserted toward the pocket end 176 formed by the fold of the outer base substrate 166 and an end 172 of the folded interior base substrate 190 extends from the open end of the exterior base substrate 166. The folded interior base substrate 190 thereby provides multiple layers of heat resistant coatings between interior surfaces 166A, 166B of the folded outer base substrate 166. In particular, six different heat resistant coating layers can be provided between interior surfaces 166A, 166B of the folded outer base substrate 166 with the outer surfaces 166C formed by the folded outer base substrate 166 can contact the rim of the drum and bulkhead within the dryer.

As above, the outer base substrates shown in FIGS. 10A-10G can comprise a textile material, such as a woven, nonwoven, and/or a knit as well as, in some embodiments, a film. According to some embodiments, the outer base substrates can be a needle punched nonwoven textile material formed from entangled fibers of wool, polyester, other synthetic fiber, or blends thereof. Similarly, the interior base substrates can also comprise a textile material, such as a woven, nonwoven, and/or a knit as well as, in some embodiments, a film. According to some embodiments, the interior base substrates can be a needle punched nonwoven textile material. In some embodiments, the interior base substrates can comprise a point-bonded nonwoven sheet. For example, the point-bonded sheet can comprise a point-bonded nonwoven web of thermoplastic and/or thermoset polymers. In some embodiments, the interior base substrates can comprise polyester or other synthetic fibers. It is likewise contemplated that other materials, sizes, and/or constructions may be utilized if desired.

In the dryer seals 160 depicted in FIGS. 10C-10D, the securement line 170 can defines an inboard boundary of the pocket 176. The securement line 170 can be formed in any suitable manner including, but not limited to, heat bonding, adhesive bonding, ultrasonic welding, RF welding, stitching, such as a chain stitch or lock stitch construction, or the like. In one example construction, the securement, line 170 comprises a stitch line that can incorporate a stitch density of about 5 to about 13 stitches per inch. However, it is likewise contemplated that other stitching arrangements and/or welding or bonding arrangements may be utilized if desired.

Figure 10H:
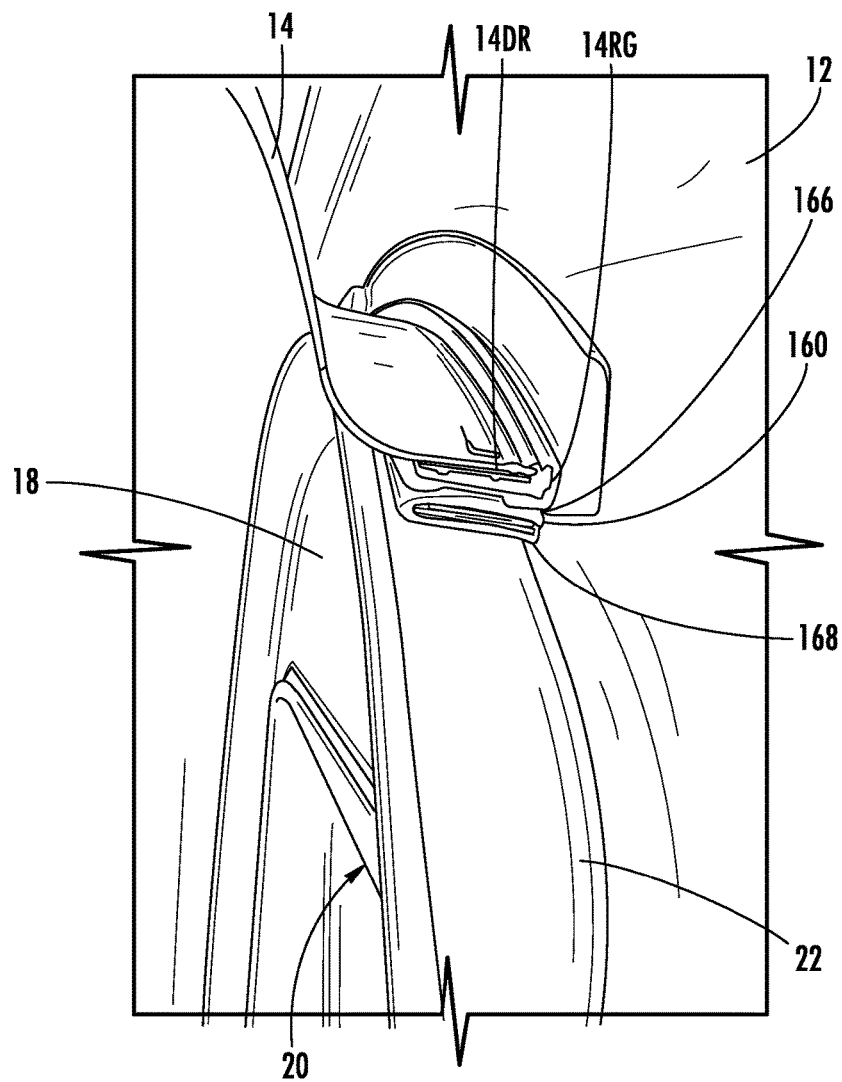
FIG. 10H illustrates a schematic partial cross-section view of the embodiment of the front dryer seal according to FIGS. 10A-10C disposed within an embodiment of a clothes dryer according to the present subject matter.

A partial cross-section of a drum rim 14 and dryer seal 160 within a dryer is depicted in FIG. 10H. The dryer seal 160 can be placed in a dryer, for example, between a front bulkhead flange 22 of a front bulkhead 18 with a door 20 therein and a drum rim 14DR of a rotatory drum 14. The placement of dryer seal 160 can thus be on an outside perimeter of the mouth in the front bulkhead 18 covered by the door 20 and the mouth in the drum 14 formed by the rim 14DR. The rim 14DR may include a rim guard 14RG to which the seal 160 is attached. The outer base substrate 166 contacts the rim 14DR of the drum 14 and bulkhead flange 22 within the dryer. The folded outer substrate 166 can provide a friction-reducing surface between the rotating drum and the bulkhead sections while also maintaining a seal to hold drying heat within the drum 14. The one or more interior base substrates 168 remain basically within the folded outer base substrate 166. If a fire was to ignite in the interior of the drum 14, the heat resistant coatings on the one or more interior base substrates 118 can swell and/or form a char to provide insulation against the heat and flames of the fire and, in some instances, to facilitate the smothering of the fire within the drum 14 of the dryer.

In some embodiments of dryer seals, the ends of, the elongate substrates can be secured together by a flexible connector body instead of the ends being secured directly together as shown in FIGS. 7A and 10A. For example, as partially shown in FIGS. 11A and 11B, an embodiment of a front dryer drum seal, generally designated 200, can comprise a sealing structure of a first elongate base substrate 204 secured along a securement line 208 to a second elongate base substrate 202. The first and second elongate base substrates 204, 202 can be secured together at their ends by a connector body 210 to form an annular shape of the dryer seal 200. In particular the connector body 210 comprises a bearing support that can be secured to the front bulkhead of a dryer using attachment, apertures 212 to provide support for the drum rotation. The connector body 210 can be secured to a first end 214 of the first and second elongate base substrates 204, 202 and to a second end (not shown) of the first and second elongate base substrates 204, 202 in a variety of ways, including, but not limited to, sewing, stitchbonding, heat bonding, adhesive bonding, RF welding, ultrasonic welding, or the like. The connector body 210, i.e., bearing or bearing support, can, for example, comprise a segment of hard laminated wool and polyester felt to create a bearing surface for locating the seal on an upper position on the front bulkhead. For example, the connector body 210 can be positioned on the front bulkhead so as to reside between 10 o'clock and 2 o'clock to provide a front bearing support for the drum rotation. In some embodiments, the connector body 210 can be typically be about 0.400 inches in height. The connector body 210 locates the drum in the vertical axis. The first, and second elongate base substrates 204, 202 can form the rest of front dryer drum seal and act as a seal and air flow restriction surface when the dryer is operating.

Figure 11A:
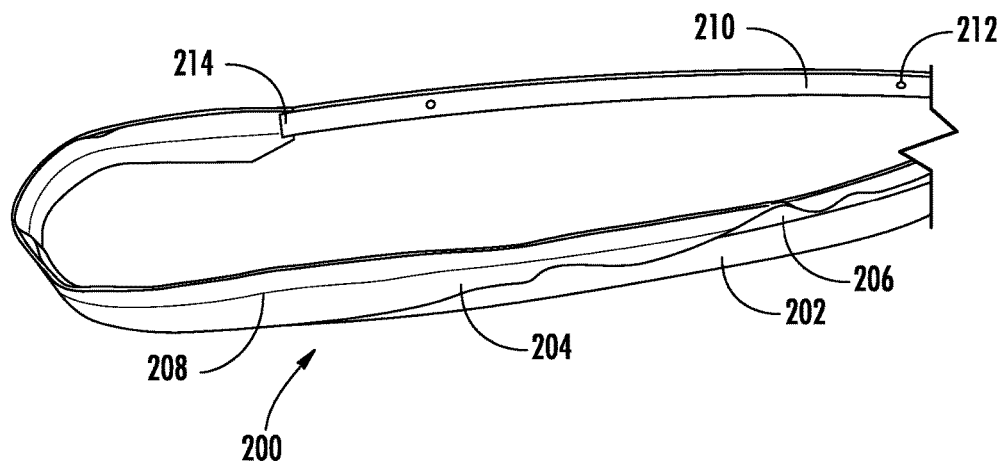
FIGS. 11A-11B illustrate perspective views of another example embodiment of a front dryer seal according to the present subject matter.
Figure 11B:
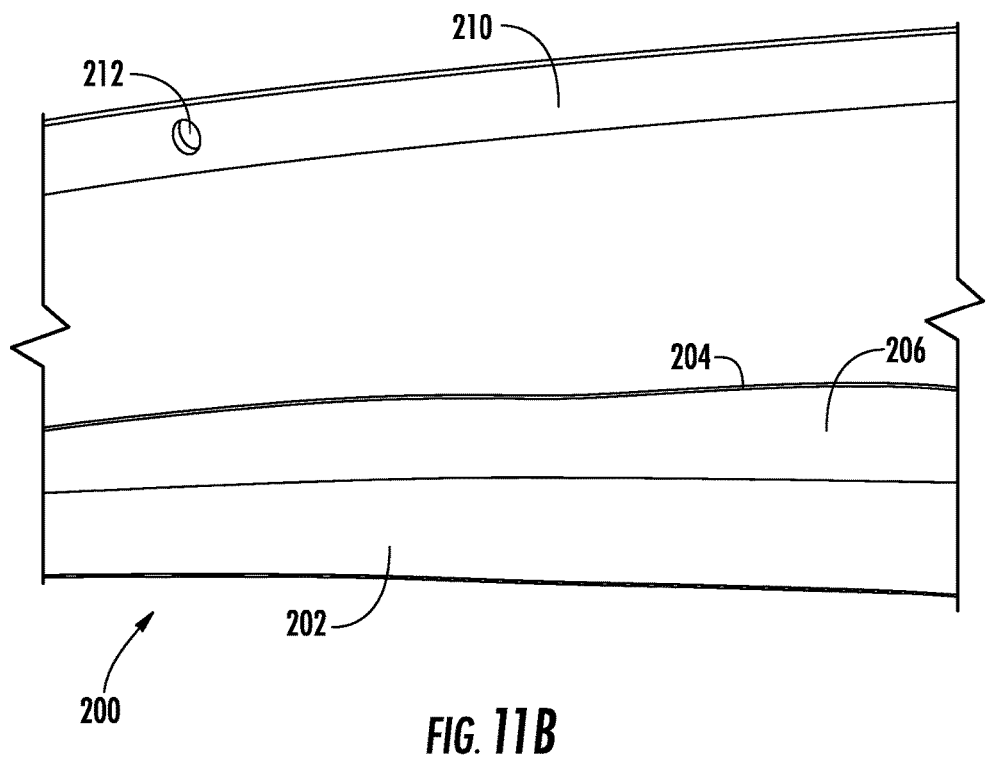

As shown in the embodiment in FIGS. 11A and 11B, the first elongate base substrate 204 can have a heat resistant coating 206 which can be the same or similar to the embodiments described above, secured on a first surface of the first elongate base substrate 204 that can face the second elongate base substrate 202. The heat resistant coating 206 can include intumescent substances and/or inorganic mineral material that can swell and can deflect and/or absorb heat energy applied to the coating as described above. The heat resistant coating 206 is securely between the first and second elongate base substrates 204, 202 when the dryer seal 200 is install and will only become visible in the event of fire inside the dryer destroying the second elongate base substrate 202 and activating the intumescent substances and/or inorganic mineral material. For example, if an intumescent material is used, a thin layer of the heat resistant coating can expand greatly. For instance, typically, one 0.011 inches thick intumescent lamination can grow to approximately 0.300 inches when heat activated. This expanded material can restrict air flow into the drum after a combustion event.

Figure 11C:
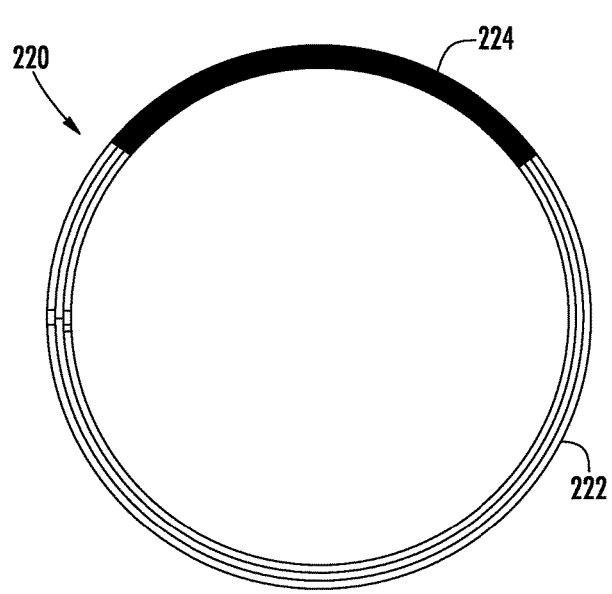
FIGS. 11C-11D illustrate a respective schematic front plan view and side plan view of a further example embodiment of a front dryer seal according to the present subject matter.
Figure 11D:
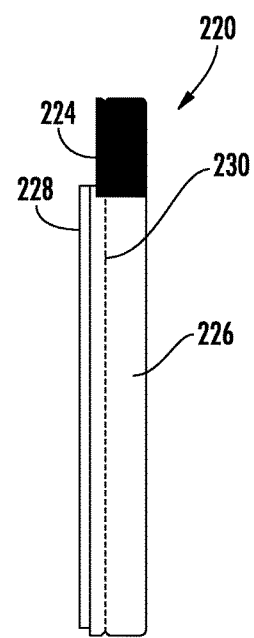

Similarly, FIGS. 11C and 11D illustrate an embodiment of dryer seal, generally designated 220. The dryer seal 220 can comprise a bearing support 224 that can comprise a segment, of hard laminated wool and polyester felt to create a bearing surface for locating the seal on an upper position on the front bulkhead. The dryer seal 220 can also comprise a sealing structure 222 that can include a structure similar to those depicted in FIGS. 10A-10F that can provide a tri-lamination insert. For example, the dryer seal 220 can also comprise a folded over elongate exterior base substrate 226 and one or more elongate interior base substrates 228. In particular, the sealing structure 222 can be formed by folding an outer base substrate 226 around the one or more interior base substrate 228 and applying the securement line 230 to the layered structure 222 to secure the components in place relative to one another. The one or more elongate interior base substrates 228 can have similar structures to those one or more elongate interior base substrates illustrated in FIGS. 10C-10F.

As above, the outer base substrate 226 can encapsulate one or more elongate interior base substrates 228 that include the heat resistant coating that only becomes visible in the event of fire inside the dryer that destroys the outer base substrate 226 and activating the tri laminate insert of the one or more elongate interior base substrates 228.

The amount of heat resistant coating can be applied in a manner that can be similar to or match the tolerances of the drum within the dryer. For example, a typical dryer drum in its optimum design condition has a drum/bulkhead tolerance of approximately 0.600 inches. As, stated above, in some embodiments, heat resistant coatings on the surfaces of an interior base substrate that equal about 0.011 inches thick that includes an, intumescent substance can grow to approximately 0.300 inches when heat activated. Thus, for a tolerance of approximately 0.600 inches, a double layer of interior base substrates with each interior base substrate having heat resistant coatings that equal about 0.011 inches can produce a full intumescent restriction within the drum and bulkhead gap.

In embodiments of dryers that use seals that comprise an upper hard felt bearing as shown in FIGS. 11A-11D, the bearing can add a further drum/bulkhead clearance of approximately 0.300 to approximately 0.400 inches when and if the bearing portion is destroyed by the combustion event or fire. Thus, the dryer seals used therein can comprise three layers of interior base substrates as shown in FIGS. 10C-10F. The three layers of interior base substrates can be used with the heat resistant coatings that equal about 0.011 inches that, when activated by heat can expand to a size that generally occupies the clearance tolerances, i.e., about 0.900 inches to about 1 inch, between the drum and bulkhead when the bearing portion of the dryer seal is also destroyed. Thus, the amount of heat resistant coating(s) and/or the number of interior base substrates can be varied based on tolerances of the drum, bulkhead and seal within the dryer to maximize the restriction of air flow by the expanded seal portion after a combustion event occurs within the drum.

Through heat and flame resistant coatings that comprises mineral based material and/or intumescent substances that is applied on flexible substrates, seals can be provided for use within domestic appliances, such as dryers, that can provide better protection against fire and against exposure to higher temperatures. Current technology uses treated polymers to achieve flame retardant requirements, but fails at heat above about 400° F. Natural or blends of natural fibers can extend the temperature to about 700° F. and are commonly used in such seal applications. Treated synthetic fibrous cellulosic materials are also used in the current technology, but these materials also do not provide the necessary protection at the potential temperature experienced in a dryer fire. The introduction of a vermiculite based and/or intumescent technology seal can extend the range of heat resisting properties whilst enhancing both the static and dynamic fire containment properties in front and/or rear seals used in clothes dryers to help satisfy industry and governmental standards.

In summary, fire retardant dryer seals are provided. The dryer seals can comprise an elongate, flexible first base substrate strip having a first end and a second end. The first base substrate strip can comprise a first side having a first, surface and a second side opposite the first side. The second side can have a second surface opposite the first surface. The first end and the second end of the first base substrate strip can be secured together so that the first base substrate strip forms at least a portion of an annular shape. A heat resistant coating can be disposed on the first surface and the heat resistant coating. In some embodiments, the heat resistant coating can comprise particles of an inorganic mineral dispersed within a film-forming binder. In some embodiments, the heat resistant coating can comprise an intumescent substance within a binder. In some embodiments, the heat resistant coating can comprise particles of an inorganic mineral material dispersed within a film-forming binder that includes at least one intumescent substance.

In some embodiments, the inorganic mineral material can comprise vermiculite. In some embodiments, the inorganic mineral material comprises mica. The particles can have an average thickness of less than about 50 nm. Such particles can have a larger dimension, such as width, length, or diameter, of about 0.5 µm to about 50 µm. In some embodiments, the particles can have an average thickness of about 1 nm to about 2 nm. In such embodiments, the particles can have an average larger dimension, such as width, length, or diameter, of about 20 µm to about 40 µm. In some, embodiments, the particles can have an aspect ratio (larger dimension:thickness) of between about 500:1 to about 1000:1.

The film-forming binder can also comprise an acrylic resin, a styrene-butadiene rubber, a polyvinyl alcohol, an ethyl vinyl acetate resin, a phenolic resin, or a combination thereof. The heat resistant coating can, in some embodiments, comprise a surfactant. In some embodiments, the heat resistant coating can further comprise a plasticizer.

In some embodiments, the inorganic mineral material can comprise about 50% by weight to about 95% by weight of the heat resistant coating upon drying. The heat resistant coating can have an average thickness of about 10 µm to about 1 mm. In some embodiments, the heat resistant coating can have an average thickness of about 10 µm to about 100 µm. In some embodiments of the dryer seal, the first base substrate is folded and the first surface on which the heat resistant coating is disposed can comprise an interior portion of the folded first substrate.

In some embodiments, the dryer seal can comprise a second base substrate secured to the first base substrate. The first base substrate can comprise a point-bonded sheet. The point-bonded sheet can comprise a point-bonded nonwoven web of thermoplastic and/or thermoset polymers. In some embodiments, the first base substrate can comprise a needlepunched nonwoven. In some embodiments, the first base substrate can be a scrim. The scrim can comprise a fiberglass scrim.

In some such embodiments, the second substrate can be folded and the first substrate inserted between the folds of the second substrate so that the second substrate forms outer exterior surfaces of the dryer seal. The first base substrate can provide multiple layers of heat resistant coating. In some embodiments, the first and second surfaces of the first base substrate can both have a heat resistant coating thereon. In some such embodiments, the first base substrate can be folded and secured within a fold of the second base substrate so that the folded first base substrate provides four layers of heat resistant coating between the outer exterior surfaces formed by the folded second base substrate. In some embodiments the first base substrate with a heat resistant coating on the first and second surfaces can provide multiple layers of heat resistant coating. For example, the first base substrate can, provide six layers of heat resistant coating between the exterior surfaces of the second substrate. In such embodiments, the first base substrate with a heat resistant coating on the first and second surfaces can comprise two folds to provide to provide six layers of heat resistant coating. In some embodiments, the dryer seal can comprise multiple first base substrates with at least one of the first surface and the second surface of each of first base substrates having a heat resistant coating thereon.

In some embodiments, at least a portion of a surface of the second base substrate can have a heat resistant coating thereon. In some such embodiments, the surface of the second base substrate with the heat resistant coating thereon comprises an interior surface of the dryer seal.

A method of forming a fire retardant dryer seal is also provided. The method can include wet-laying a coating composition onto at least a portion of a first surface of a first base substrate. The coating composition can comprise particles of an inorganic mineral material, a film-forming binder, and a solvent. The coating composition can be dried to remove the solvent and form a heat resistant coating on the first base substrate. Ends of the first base substrate can be to each other to form an annular configuration of the dryer seal. In some embodiments, the inorganic mineral material can be dispersed within the solvent prior to wet-laying the coating composition onto the base substrate. Also, prior to wet-laying the coating composition onto the base substrate, the inorganic mineral material can be exfoliated to form the particles. For example, the inorganic mineral material can be exfoliated to form the particles for dispersing in the solvent.

In some such embodiments, the inorganic material can comprise vermiculite or mica. The inorganic material can comprise about 50% by weight to about 95% by weight of the heat resistant coating upon drying.

The film-forming binder of the coating, composition can comprise an acrylic resin, a styrene-butadiene rubber, a polyvinyl alcohol, an ethyl vinyl acetate resin, a phenolic resin, or a combination thereof. The solvent of the coating composition can, for example, be water. The coating composition can further comprise a surfactant.

After drying, the heat resistant coating has an average thickness of about 10 µm to about 1 mm. For example, the heat resistant coating has an average thickness of about 10 µm to about 100 µm.

The method can further comprise folding the first base substrate and securing, the first base substrate in a folded position. In such embodiments, the surface of the first substrate on which the heat resistant coating is disposed can form an interior portion of the dryer seal. In some embodiments, a second base substrate can be secured to the first base substrate.

In some embodiments, the second substrate can be folded over the first substrate so that the second substrate forms outer exterior surfaces of the dryer seal. The second base substrate can be secured in this folded position around the first substrate. In some such method embodiments, the coating composition can be applied to both the first and second surfaces of the first base substrate with the coating compositions then being dried thereon to form heat resistant coatings on the first and second surfaces of the first base substrate. The method can also comprise folding and securing the first base substrate within a fold of the second base substrate. In such embodiments, the dryer seal can comprise multiple layers of heat resistant coatings. For example, the folded first base substrate can provide two or more layers of heat resistant coating between the outer exterior surfaces formed by the folded second base substrate. In some embodiments, the folded first base substrate can provide four layers of heat resistant coating between the outer exterior surfaces formed by the folded second base substrate. In some embodiments, the folded first base substrate can provide six layers of heat resistant coating between the outer exterior surfaces formed by the folded second base substrate.

In some method embodiments, the coating composition can also be applied to at least a portion of a surface of the second base substrate has a heat resistant coating thereon. In some such embodiments, the surface of the second base substrate with the heat resistant coating thereon can comprise an interior surface of the dryer seal.

In some embodiments, another substrate can be secure between the ends of the first base substrate to secure the ends of the first base substrate to each other to form the annular configuration of the dryer seal.

These and other modifications and variations to the present subject matter may be practiced by those of ordinary skill in the art, without departing from the spirit and scope of the present subject matter, which is more particularly set forth herein above. In addition, it should be understood the aspects of the various embodiments may be interchanged both in whole or in part. Furthermore those of ordinary skill in the art will appreciate that the foregoing description is by way of example only, and is not intended to limit the present subject matter.

What is claimed is:

1. A fire retardant dryer seal comprising:
   at least one friction-reducing outer base substrate having a first end and a second end, the at least one outer base substrate forming a friction-reducing outer surface of the dryer seal for contacting with portions of a dryer;

at least one interior base substrate having a first surface and an opposing second surface, the at least one interior base substrate secured to the at least one outer base substrate;

the first end and the second end of the at least one outer base substrate secured together so that the at least one outer base substrate forms at least a portion of an annular shape; and a heat resistant coating disposed on at least one of the first surface or second surface of the at least one interior base substrate in an amount that, upon exposure to sufficient heat, expands to a size that limits airflow into the drum of the dryer by an amount that does not permit sufficient oxygen to enter the drum to create a combustion event that will exceed a temperature of 800° F., the heat resistant coating comprising particles of an inorganic mineral material dispersed within a binder.

2. The fire retardant dryer seal according to claim 1, wherein the at least one outer base substrate comprises a nonwoven fabric, woven fabric or a knitted fabric and the at least one interior base substrate comprises a nonwoven fabric, woven fabric or a knitted fabric.

3. The fire retardant dryer seal according to claim 1, wherein the at least one outer base substrate forms an elongate pocket and the at least one interior base substrate resides within the pocket of the at least one outer base substrate so that the at least one outer base substrate forms the friction-reducing outer surfaces of the dryer seal.

4. The fire retardant dryer seal according to claim 3, wherein the heat resistant coating disposed on both the first and second surfaces of the at least one interior base substrate.

5. The fire retardant dryer seal according to claim 4, wherein the at least one interior base substrate is folded to form multiple layers of the heat resistant coating.

6. The fire retardant dryer seal according to claim 4, wherein the at least one interior base substrate is folded to form six layers of the heat resistant coating.

7. The fire retardant dryer seal according to claim 4, wherein the at least one interior base substrate comprises multiple interior base substrates that reside within the pocket of the at least one outer base substrate to form multiple layers of the heat resistant coating.

8. The fire retardant dryer seal according to claim 1, wherein the inorganic material comprises at least one of vermiculite or a mica.

9. The fire retardant dryer seal according to claim 1, wherein the particles have an average thickness of less than about 50 nm, and wherein the particles have a larger dimension of about 0.5 μm to about 50 μm.

10. The fire retardant dryer seal according to claim 1, wherein the film-forming binder comprises at least one intumescent substance.

11. A fire retardant dryer seal comprising:
an elongate, flexible first base substrate having a first end and a second end, the first base substrate comprising a first surface and a second surface opposite the first surface;

the first end and the second end of the first base substrate secured together so that the first base substrate forms at least a portion of an annular shape; and a heat resistant coating disposed on the first surface of the first base substrate in an amount that, upon exposure to sufficient heat, expands to a size that limits airflow into the drum of the dryer by an amount that does not permit sufficient oxygen to enter the drum to create a combustion event that will exceed a temperature of 800° F.

12. The fire retardant dryer seal according to claim 11, wherein the heat resistant coating comprises particles of an inorganic mineral dispersed within a film-forming binder.

13. The fire retardant dryer seal according to claim 12, wherein the inorganic material comprises at least one of vermiculite, mica, clay materials, or calcium carbonate.

14. The fire retardant dryer seal according to claim 12, wherein the particles have an average thickness of less than about 50 nm, and wherein the particles have a largest dimension of about 0.5 μm to about 50 μm.

15. The fire retardant dryer seal according to claim 11, wherein the heat resistant coating comprises at least one intumescent substance.

16. The fire retardant dryer seal according to claim 11, wherein the first base substrate is folded and the first surface on which the heat resistant coating is disposed comprises an interior portion of the folded first substrate and the second surface forming a friction-reducing outer surface of the dryer seal for contacting with portions of the dryer and the drum of the dryer.

17. The fire retardant dryer seal according to claim 11, further comprising a second base substrate secured to the first base substrate, the second base substrate forming a friction-reducing outer surface of the dryer seal for contacting a portion of a dryer.

18. The fire retardant dryer seal according to claim 17, wherein the first and second surfaces of the first base substrate have a heat resistant coating thereon.

19. A method of forming a fire retardant dryer seal, the method comprising:
wet-laying a coating composition onto at least a portion of a first surface of a first base substrate in an amount that, upon exposure to sufficient heat, expands to a size that restricts airflow into a drum of a dryer to between about 15 cubic feet per minute to about 30 cubic feet per minute, wherein the coating composition comprises particles of an inorganic mineral, a film-forming binder, and a solvent;

drying the coating composition to remove the solvent and form a heat resistant coating on the first base substrate; and securing ends of the first base substrate to each other to form an annular configuration of the dryer seal.

20. The method according to claim 19, further comprising:
prior to wet-laying the coating composition onto the base substrate, dispersing the inorganic material within the solvent.

* * * * *